Jan. 9, 1962  H. S. HEMSTREET  3,015,988
PERSPECTIVE ALTERATION MEANS
Filed Nov. 25, 1955  10 Sheets-Sheet 1

HAROLD S. HEMSTREET
INVENTOR

BY Richard G. Stephens
ATTORNEY

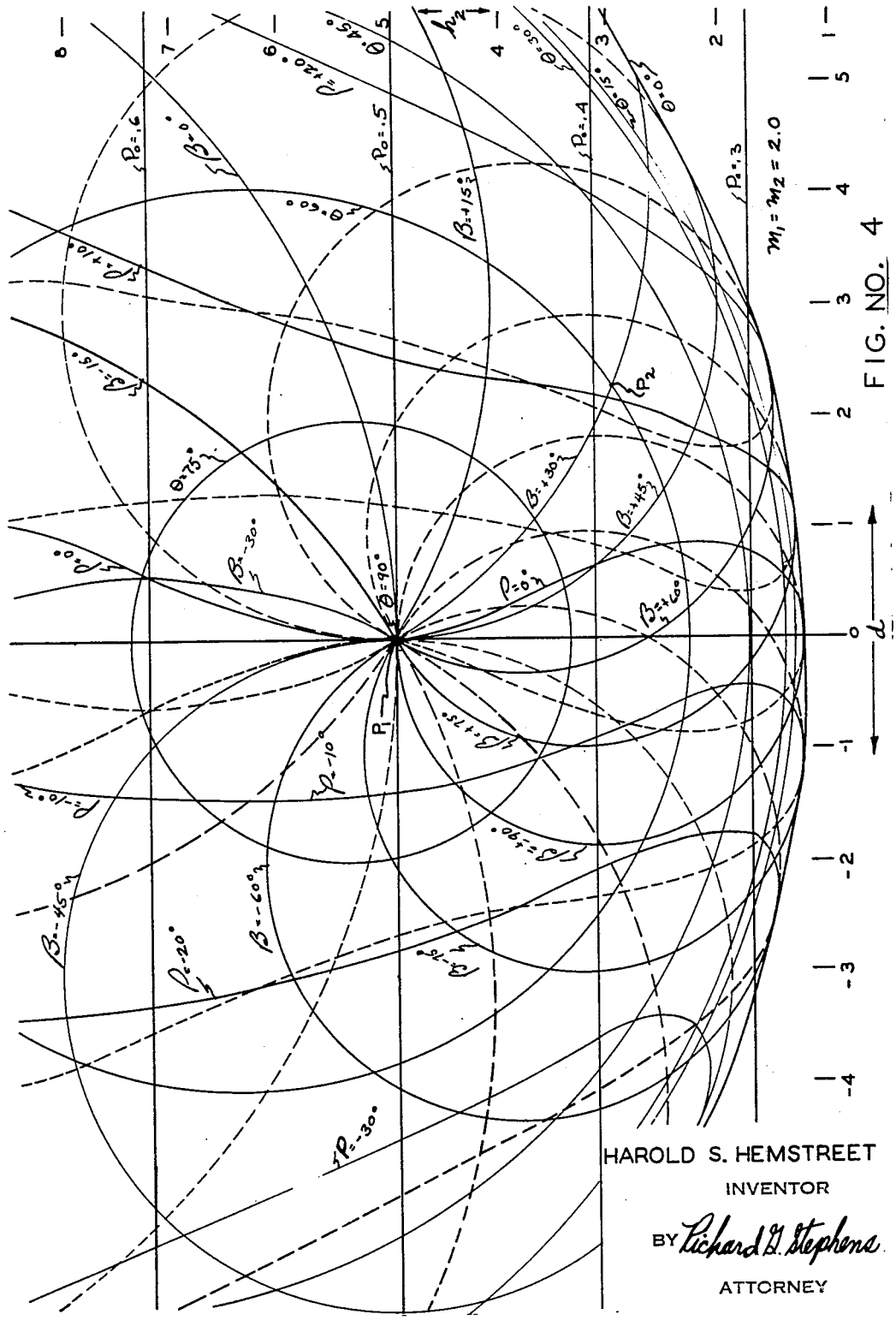

HAROLD S. HEMSTREET
INVENTOR

BY *Richard D. Stephens*

ATTORNEY

HAROLD S. HEMSTREET
INVENTOR

BY Richard L. Stephens
ATTORNEY

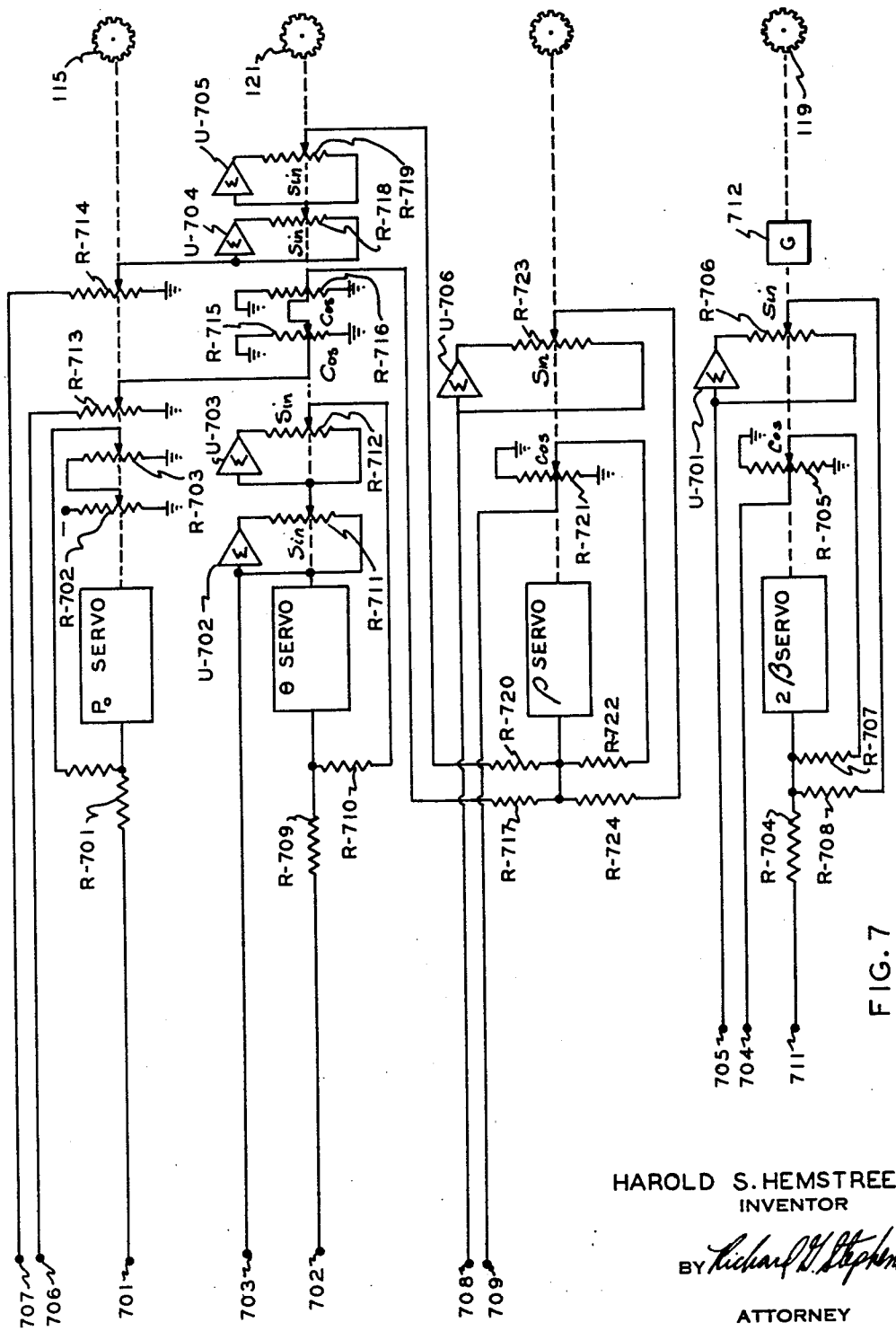

Jan. 9, 1962  H. S. HEMSTREET  3,015,988
PERSPECTIVE ALTERATION MEANS
Filed Nov. 25, 1955  10 Sheets-Sheet 8

HAROLD S. HEMSTREET
INVENTOR

BY Richard L. Stephens
ATTORNEY

HAROLD S. HEMSTREET
INVENTOR

Jan. 9, 1962  H. S. HEMSTREET  3,015,988
PERSPECTIVE ALTERATION MEANS
Filed Nov. 25, 1955  10 Sheets-Sheet 10

HAROLD S. HEMSTREET
INVENTOR

BY Richard L. Stephens
ATTORNEY

United States Patent Office 3,015,988
Patented Jan. 9, 1962

3,015,988
PERSPECTIVE ALTERATION MEANS
Harold S. Hemstreet, Binghamton, N.Y., assignor to General Precision, Inc., a corporation of Delaware
Filed Nov. 25, 1955, Ser. No. 548,842
13 Claims. (Cl. 88—57)

This invention relates to apparatus for altering the apparent perspective of images and is a continuation-in-part of my copending applications Serial No. 480,033 filed Jan. 5, 1955 for "Visual Display Method and Apparatus," Serial No. 500,325 filed April 11, 1955 for "Simulated Viewpoint Displacement Method and Apparatus" and Serial No. 511,488 filed May 27, 1955, now Patent No. 2,975,671, for "Method and Means for Altering Apparent Perspective of Images," all of which are assigned to the same assignee as the present invention. In these copending applications I have shown various methods and means by which images having the appearance of areas as viewed from particular viewpoints may be "distorted" or altered to provide images having the appearance of the same areas as viewed from different angles or displaced viewpoints. Method and apparatus capable of such image alteration is of considerable use in numerous applications, including, for example, apparatus for use in conjunction with camera equipment to provide pictures having the appearance of having been taken from remote or inaccessible locations, the production of realistic visual displays for use with training and simulating equipment, and the production of slanted lettering, designs, drawings and the like to produce unique and artistic effects.

The construction of particular physical embodiments of the invention is greatly facilitated if a wide latitude is allowed to the designer, and hence it becomes a primary purpose of this invention to provide further means for altering the apparent perspective of images. For example, certain optical embodiments of each of the systems described in the aforementioned copending applications require the use of a variable power anamorphoser. Since such anamorphosers are not usually available commercially in a wide variety of sizes and ranges, it becomes desirable to provide a system in which fixed power anamorphosers may be utilized. This invention provides a plurality of new means for altering the apparent perspective of images, and each of the new means has specific characteristics which may be utilized to advantage in practising the invention. It is therefore a primary object of the invention to provide improved means for altering the apparent perspective of an image of an area to provide a resulting image having a displaced center of perspective.

It is an additional object of the invention to provide means by which any desired number of primitive transformations may be utilized in altering the perspective of an image.

It is a further object of the invention to provide means utilizing two primitive transformations and one scale change or magnification to provide images altered in perspective.

Other objects of the invention will in part be obvious and will in part appear hereinafter as the description proceeds.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which:

FIG. 4 is a graph showing the relationship between desired viewpoint displacement or change in perspective and the control adjustments which may be made to a particular embodiment of the optical apparatus to attain such change in perspective;

FIGS. 6 and 7 are electrical schematic diagrams illustrating an automatic control computer which may be utilized to receive input quantities in terms of viewpoint displacements and to provide the proper output quantities to operate a particular embodiment of the invention;

Figure 5A:
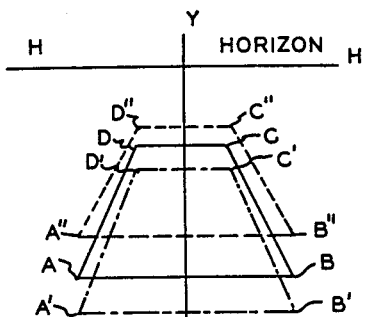
FIGS. 5a through 5d are geometrical diagrams illustrating one manner in which images may be altered in order to provide perspective alteration.
Figure 5B:
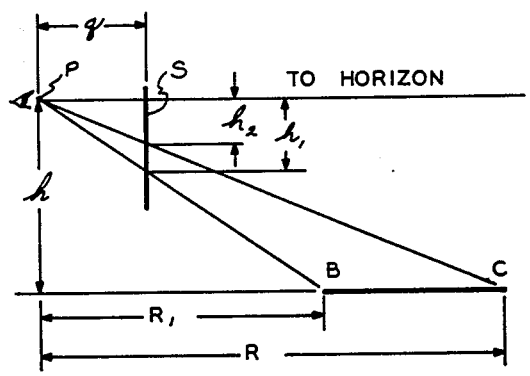

Shown in heavy lines in FIG. 5a is a trapezoidal or keystone-shaped area ABCD such as the appearance a rectangular surface might present when viewed in perspective at a point situated at a particular place in line with the centerline Y—Y of the surface. From a position higher in altitude than the initial viewpoint, the area might have an appearance such as trapezoid A'B'C'D', and when viewed from a position lower in altitude than the initial viewpoint, the area might have an appearance such as trapezoid A"B"C"D". In FIG. 5a line H—H represents the horizon or line at infinity. Shown in FIG. 5b is a side elevation view showing an eye situated at point P viewing a rectangular surface at an altitude $h$ above said surface, the side BC of said surface being shown as a heavy line. It will be seen that if a screen S is placed a distance $q$ in front of viewpoint P, that a replica of the actual scene viewed from viewpoint P may be simulated by presentation of a proper scene on screen S. Assuming that screen S is mounted in a generally vertical position as shown, it may be seen that in order to effectuate a realistic presentation, that the distances of objects below the horizon line on screen S must be inversely proportional to the actual horizontal distance between these points and the ground position of the viewpoint. For example, the distance $h_1$ on screen S between the horizon and the simulated near end AB of the surface must be inversely proportional to $R_1$, the horizontal distance between viewpoint P and the actual near end AB of the grounded surface, or as may be seen by similar triangles:

$$h_1 = h\left(\frac{q}{R_1}\right)$$

Similarly, the distance $h_2$ on screen S between the horizon and the simulated far end CD of the rectangular surface is inversely proportional to $R_2$, the horizontal distance between the viewpoint P and the actual distance to the far end of the rectangular surface, or that:

$$h_2 = h\left(\frac{q}{R_2}\right)$$

It may now be appreciated that for proper presentation of a scene simulating a surface seen in perspective, that increases in viewpoint altitude require proportionate increases in distances $h_1$ and $h_2$ of such a scene, and that conversely, decreases in viewpoint altitude require proportionate decreases in distances $h_1$ and $h_2$ of such a scene. Hence if a photograph were taken of a scene at a particular viewpoint, an appropriate stretching or squeezing of the image from such photograph with respect to the horizon would yield scenes such as those viewed at points above and below the point where the picture was taken in the same plane as that in which the picture was taken.

Figure 5D:
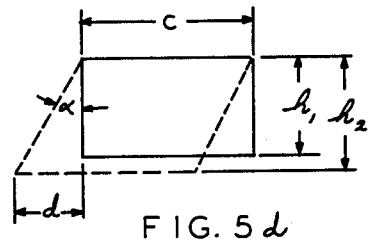
Figure 5C:
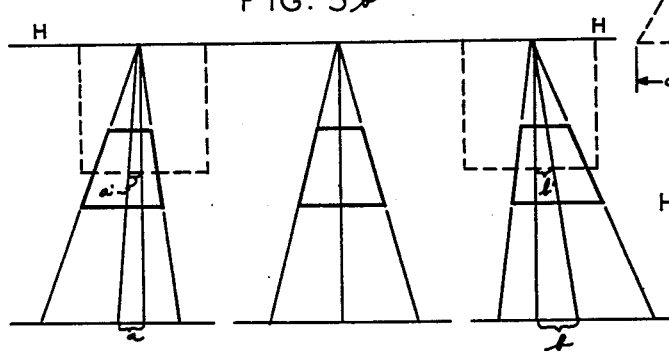

Shown in FIG. 5c are the appearances which a rectangular surface might have when viewed from three viewpoints of the same altitude but varying in lateral position with respect to the grounded surface. The center portion of FIG. 4c illustrates the scene which might be viewed from a viewpoint located on the longitudinal centerline of the surface. The left-hand portion of FIG. 5c illustrates the same surface viewed from a location located a distance "a" to the right of the centerline of the surface, and the right-hand portion of FIG. 5c illustrates the same surface viewed from a viewpoint located a distance "b" to the left of the centerline of the surface. Superimposed upon each portion of FIG. 5c in dashed lines is a rectangle which may represent a photographic slide which might be used to project a simulated scene. It may be seen that the displacements $a'$ and $b'$ of the centerline on the slide at the lower edge of the frame are proportional to the ratio of the lateral displacement of the viewpoint to altitude of the viewpoint. If pictures were taken so that the horizon in each picture would be located along the upper edge of the frame, then the lateral displacement of any point in the picture from its position in the center portion of FIG. 5c is proportional to the distance from the point to the top of the frame. Thus it may be seen that by providing "distortion" of an image varying in accordance with the magnitude of lateral viewpoint displacement from a reference viewpoint and varying linearly from zero distortion at the line at infinity or horizon to maximum distortion at a nearest location, that scenes varying in accordance with lateral displacement of a viewpoint may be produced. I have designated such distortion as "shear distortion" since it produces a shape similar to those produced by applying pure shear forces to an elastic member. Now it should be understood that by stretching or squeezing an image of an area with respect to its line at infinity or horizon, and by shearing the image linearly as described above, images may be altered to provide resulting images which represent the appearance of the same scene as viewed from a different location within the plane of the original viewpoint. The plane of the original viewpoint will comprise, for example, in relation to an original image photographed by a camera, the plane which the camera film appears to occupy when viewed from the center of the camera lens. The distortion required to simulate viewpoint displacement is explained in a slightly different manner in my copending application Serial No. 511,488 and reference may be had to said application for further discussion of the phenomena. Although the above explanation is given principally in terms of an outdoor scene in which the line at infinity is the actual horizon, it should be noted that the theory applies quite as readily to all other images.

Assume that the rectangle of FIG. 5d represents an image of a surface as viewed from an original viewpoint, such as the image which might be formed by photographing the surface from the original viewpoint. Let the upper edge of the rectangle represent the horizon or line at infinity of the image. If the original image is expanded and sheared in accordance with the rules given above for a viewpoint displacement, it will result in a parallelogram image having a new height and a slope, perhaps as shown by the parellelogram of FIG. 5d. For producing distortion to simulate a required viewpoint displacement, three relationships between the undistorted image (rectangle) and the distortion image (parellelogram) may be determined: (1) the ratio of heights, $h_2$ to $h_1$; (2) the slope angle $\alpha$; and (3) the fact that the horizon dimension ($c$ in FIG. 4d) remains constant.

Figure 8A:
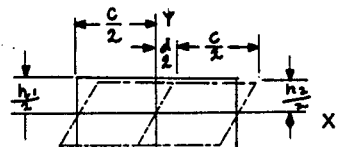
FIGS. 8a through 8f are geometrical diagrams illustrating the relationships between successive transformations utilized as steps of a specific method of the invention.

The optical alteration of a rectangle image to a parallelogram image may be done as shown in FIG. 8a, which corresponds to FIG. 5d except that the horizon line portions of the original and altered images are not coincident. It will be seen that if an original image such as represented by the rectangle of FIG. 8a were expanded vertically and sheared so as to provide an altered image such as that represented by the parallelogram of FIG. 8a, that mere shiftings of the altered image upwardly and leftwardly would allow the horizons (top lines) of the images to coincide. In many uses of the invention it is not necessary to maintain horizon portions of successive images coincident as viewpoint displacement is varied, but in motion picture systems for observation by stationary observers it is usually desirable. If the horizon portion of an original image is projected along the optical axis of distorting means utilizing a coaxial lens system, such portion of the image will remain on the axis no matter how viewpoint displacement is varied since light rays passing along the optical axis of a coaxial lens system remain undeviated. However, in systems in which it is considered desirable to project the original image with its horizon portion displaced from the optical axis, the lateral and vertical shifting necessary to maintain horizon portions of successive images coincident as viewpoint displacement is varied may be provided in accordance with the means and method set forth in my copending application Serial Number 503,211 filed April 22, 1955, now Patent No. 2,975,670, for "Method and Apparatus for Producing Visual Display."

The perspective alteration of an image signified by changing a rectangle to a parallelogram may be done by performing particular primitive transformations of the rectangle. A parallelogram having the desired size and shape may be obtained by performing two primitive transformations and one magnification or scale change, for example, and a fourth operation, a rotation, is necessary only if angular position in space of the altered image is deemed significant. Within this specification and the claims appended hereto, the term "primitive transformation" is used to mean a uni-dimensional transformation, with all dimensions along the axis of transformation being multiplied by a factor representing the "power" of the transformation, and with all dimensions normal to the axis of transformation remaining unchanged. The term "primitive transformation" is defined and explained in rigorous mathematical form on page 31, vol. II of "Differential and Integral Calculus" by R. Courant, 1936, Nordeman Publishing Company, Inc., New York, N.Y.

Figure 8B:
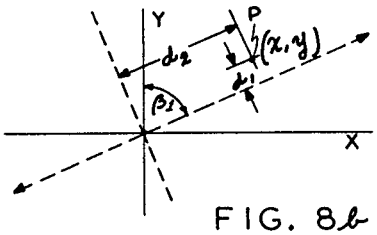

Referring to FIG. 8b, assume that a point P in an original image has coordinates $(x, y)$ with respect to axis $x$—$x$, $y$—$y$ of the original image. Assume that an anamorphoser with a power of $m_1$ acts on the image, with the power axis of the anamorphoser rotated from the $y$—$y$ axis through the angle $\beta_1$. The coordinates of point P with respect to the anamorphoser axes are shown by the distances $d_2$ and $d_1$ in FIG. 8b, and these distances may be expressed as follows:

$$d_1 = -x \cos \beta_1 + y \sin \beta_1 \quad (1)$$

$$d_2 = x \sin \beta_1 + y \cos \beta_1 \quad (2)$$

Figure 8C:
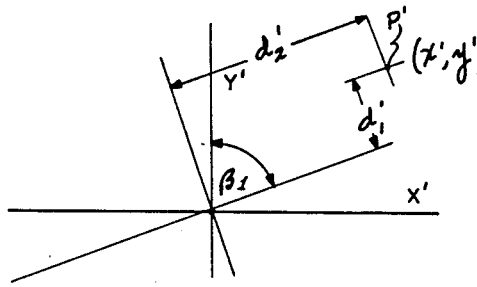

The effect of the anamorphoser is to make a primitive transformation of the original image, which multiplies the $d_2$ dimension by $m_1$ and leaves the $d_1$ dimension unchanged. The location of the point P portion of the original image after the primitive transformation has been made is shown at point P' in FIG. 8c, where the location of point P' with respect to axes $x'$—$x'$, $y'$—$y'$ is defined by coordinates $(x', y')$, and the location of point P' with respect to the anamorphoser axes is defined by dimensions $d_1'$ and $d_2'$. These distances may be expressed as follows:

$$d_1' = -x' \cos \beta_1 + y' \sin \beta_1 \quad (3)$$

$$d_2' = x' \sin \beta_1 + y' \cos \beta_1 \quad (4)$$

It is also known that the "d" quantities are related as follows:

$$d_1' = d_1 \quad (5)$$

$$d_2' = m_1 d_2 \quad (6)$$

Substituting Expressions 1 through 4 into Expressions 5 and 6 gives:

$$-x' \cos \beta_1 + y' \sin \beta_1 = -x \cos \beta_1 + y \sin \beta_1 \quad (7)$$

$$x' \sin \beta_1 + y' \cos \beta_1 = m_1 x \sin \beta_1 + m_1 y \cos \beta_1 \quad (8)$$

Solving Expressions 7 and 8 for $x'$ and $y'$ yields:

$$x' = (m_1 \sin^2 \beta_1 + \cos^2 \beta_1) x + (m_1 - 1)(\sin \beta_1 \cos \beta_1) y \quad (9)$$

$$y' = (m_1 - 1)(\sin \beta_1 \cos \beta_1) x + (\sin^2 \beta_1 + m_1 \cos^2 \beta_1) y \quad (10)$$

Equations 9 and 10 may be seen to define the coordinates of the transformed point P' in terms of the coordinates of the original point. For convenience, Equations 9 and 10 may be written as follows, using subscripts rather than primes, and considering a primitive transformation from an original or $x_1 y_1$ plane to a second or $x_2 y_2$ plane:

$$x_2 = a_1 x_1 + b_1 y_1 \quad (11)$$

$$y_2 = j_1 x_1 + k_1 y_1 \quad (12)$$

where $$a_1 = m_1 \sin^2 \beta_1 + \cos^2 \beta_1$$

$$b_1 = j_1 = (m_1 - 1) \sin \beta_1 \cos \beta_1$$

$$k_1 = \sin^2 \beta_1 + m_1 \cos^2 \beta_1$$

Now if a further anamorphoser is provided to produce a second primitive transformation (from the $x_2 y_2$ plane to the $x_3 y_3$ plane), the transformation equations will have exactly the same form as for the first transformation, and if the further anamorphoser has a power of $m_2$ acting at an angle $\beta_2$ from the reference axis of the original image, the transformation equations may be expressed as follows:

$$x_3 = a_2 x_2 + b_2 y_2 \quad (13)$$

$$y_3 = j_2 x_2 + k_2 y_2 \quad (14)$$

where $$a_2 = m_2 \sin^2 \beta_2 + \cos^2 \beta_2$$

$$b_2 = j_2 = (m_2 - 1) \sin \beta_2 \cos \beta_2$$

$$k_2 = \sin^2 \beta_2 + m_2 \cos^2 \beta_2$$

Combining Equations 11 through 14:

$$x_3 = a_2 (a_1 x_1 + b_1 y_1) + b_2 (j_1 x_1 + k_1 y_1)$$

$$y_3 = j_2 (a_1 x_1 + b_1 y_1) + k_2 (j_1 x_1 + k_1 y_1)$$

Simplifying:

$$x_3 = a_0 x_1 + b_0 y_1 \quad (15)$$

$$y_3 = j_0 x_1 + k_0 y_1 \quad (16)$$

where $$a_0 = a_1 a_2 + b_2 j_1$$

$$b_0 = a_2 b_1 + b_2 k_1$$

$$j_0 = a_1 j_2 + j_1 k_2$$

$$k_0 = b_1 j_2 + k_1 k_2$$

Figure 8D:
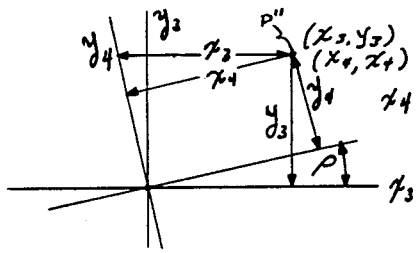

Now consider a transformation from the $x_3 y_3$ plane to the $x_4 y_4$ plane, where the axes of the $x_4 y_4$ plane are rotated through an angle $\rho$ from the $x_3 y_3$ axes as shown in FIG. 8d.

$$x_4 = x_3 \cos \rho + y_3 \sin \rho \quad (17)$$

$$y_4 = -x_3 \sin \rho + y_3 \cos \rho \quad (18)$$

Substituting Expressions 15 and 16 into Expressions 17 and 18 rearranging:

$$x_4 = A x_1 + B y_1 \quad (19)$$

$$y_4 = J x_1 + K y_1 \quad (20)$$

where $$A = (a_1 a_2 + b_1 b_2) \cos \rho + (a_1 b_2 + b_1 k_2) \sin \rho$$

$$B = (a_2 b_1 + b_2 k_1) \cos \rho + (b_1 b_2 + k_1 k_2) \sin \rho$$

$$J = -(a_1 a_2 + b_1 b_2) \sin \rho + (a_1 b_2 + b_1 k_2) \cos \rho$$

$$K = -(a_2 b_1 + b_2 k_1) \sin \rho + (b_1 b_2 + k_1 k_2) \cos \rho$$

If a magnification is introduced to alter the figure by a factor of $P_0$ in all directions, the point will have coordinates in the $x_5 y_5$ plane of:

$$x_5 = P_0 x_4$$

$$y_5 = P_0 y_4 ,$$

and substituting into Equations 19 and 20:

$$\frac{x_5}{P_0} = A x_1 + B y_1 \quad (21)$$

$$\frac{y_5}{P_0} = J x_1 + K y_1 \quad (22)$$

Expressions 21 and 22 may be seen to express in terms of its original coordinates, the coordinates of a point after two primitive transformations, one rotation and one magnification. The total transformation which is needed to change a rectangular original image to a parallelogram trapezoidal image may be seen by comparison of FIGS. 8e and 8f. Examination of these figures shows that the $x$ coordinates of a point in both figures are the same if the $y$ coordinates are zero, or if:

$$y_1 = y_5 = 0, \text{ then } x_1 = x_5$$

Substituting these conditions into Equation 21, we obtain:

$$A = \frac{1}{P_0} \quad (23)$$

$$J = 0 \quad (24)$$

Figure 8E:
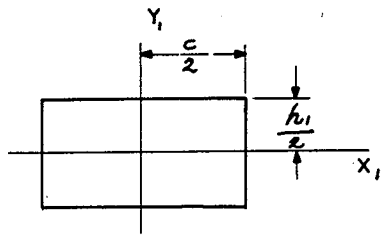
Figure 8F:
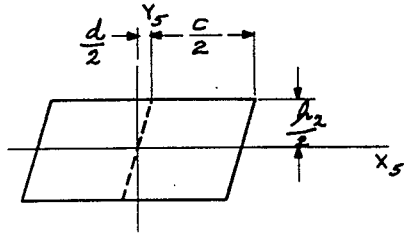

It may also be seen from examination of FIGS. 8e and 8f that the $y$ coordinate of any point having an $x$ coordinate of zero in the original image or rectangle of FIG. 8e is equal to $h_1/2$, and that the $y$ coordinate of a point having an $x$ coordinate of $d/2$ in FIG. 8f is equal to $h_2/2$.

Substituting these conditions into Equations 21 and 22:

$$\frac{d}{2P_0} = B \frac{h_1}{2} \text{ or } B = \frac{d}{h_1 P_0} \quad (25)$$

and $$\frac{h_2}{2P_0} = K\frac{h_1}{2} \text{ or } K = \frac{h_2}{h_1 P_0} \quad (26)$$

Rewriting Equations 23 through 26 and substituting for A, B, J and K, we obtain four equations which express the relationship between the original image and the final image:

$$\frac{1}{P_0} = (a_1 a_2 + b_1 b_2) \cos \rho + (a_1 b_2 + b_1 k_2) \sin \rho \quad (27)$$

$$0 = -(a_1 a_2 + b_1 b_2) \sin \rho + (a_1 b_2 + b_1 k_2) \cos \rho \quad (28)$$

$$\frac{d}{h_1 P_0} = (a_2 b_1 + b_2 k_1) \cos \rho + (b_1 b_2 + k_1 k_2) \sin \rho \quad (29)$$

$$\frac{h_2}{h_1 P_0} = -(a_2 b_1 + b_2 k_1) \sin \rho + (b_1 b_2 + k_1 k_2) \cos \rho \quad (30)$$

where $$a_1 = m_1 \sin^2 \beta_1 + \cos^2 \beta_1$$
$$b_1 = (m_1 - 1) \sin \beta_1 \cos \beta_1$$
$$k_1 = \sin^2 \beta_1 + m_1 \cos^2 \beta_1$$
$$a_2 = m_2 \sin^2 \beta_2 + \cos^2 \beta_2$$
$$b_2 = (m_2 - 1) \sin \beta_2 \cos \beta_2$$
$$k_2 = \sin^2 \beta_2 + m_2 \cos^2 \beta_2$$

Thus it may be seen that Equations 27 through 30 define the relationships between an undistorted image (rectangle) and a perspectively altered image (parallelogram) in terms of two primitive transformations such as two anamorphic magnifications, one scale change such as a spherical magnification, and one rotation. These equations may be solved simultaneously in a number of ways, and graphs may be made which indicate the values of the various quantities at various desired viewpoints. As will be further explained below, each of the basic systems constructed in accordance with this invention utilizes three dependent variables, or if additional dependent variables are used, additional restraints must be imposed upon the system.

Figure 10:
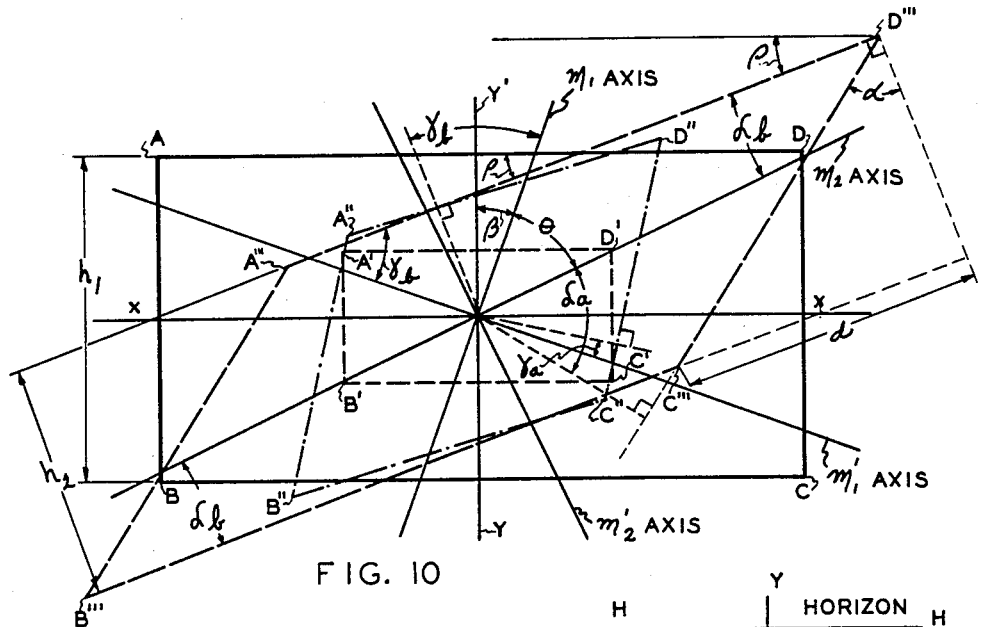
FIG. 10 is a geometrical diagram useful in understanding how the steps of the invention may combine to effect a desired perspective alteration in an image.

The alteration of the apparent perspective of an image by the steps of providing two primitive transformations, one spherical magnification (and a rotation if desired) may sometimes be better understood by reference to the geometrical diagram of FIG. 10. Centered on perpendicular axes X—X and Y—Y in FIG. 10 is a large rectangle ABCD shown in heavy lines which may be assumed to represent an original image. If such an image is uniformly magnified (by a power of less than unity in FIG. 10), there will result a scaled-down copy of the original image, such as smaller rectangle A'B'C'D'. It will be apparent that the large rectangle image may be changed to the smaller rectangle by means of an ordinary spherical lens, for example. Now assume that a primitive transformation is applied to small rectangle A'B'C'D', as by means of a first anamorphoser. If the anamorphoser is angularly oriented with its axis of magnification acting at an angle $\beta$ from axis Y—Y or along the $m_1$ axis of FIG. 10, and if the anamorphoser has a power of $m_1$, all dimensions of the small rectangle A'B'C'D' will be magnified by a factor of $m_1$ and all dimensions perpendicular to the $m_1$ axis (parallel to the $m_1'$ axis) will remain the same, resulting in a parallelogram such as A"B"C"D" shown in FIG. 10, wherein line A"D" of the parallelogram makes an angle of $\gamma_b$ with the $m_1$ axis, and line C"D" of the parallelogram makes an angle of $\gamma_a$ with the $M_1'$ axis. Assuming now that a second primitive transformation is made, as for example by means of a second anamorphoser having a power of $m_2$ and arranged to act at an angle $\theta$ from the power axis of the first anamorphoser, all dimensions of parallelogram A"B"C"D" parallel to the $m_2$ axis will be magnified by a factor of $m_2$ and all dimensions parallel to axis $m_2'$ will remain unchanged, resulting in a final image such as represented by large parallelogram A''', B''', C''', D'''. A line drawn perpendicular to side C'''D''' of the large parallelogram makes an angle of $\delta_a$ with the $m_2$ axis, and said A'''D''' of the parallelogram makes an angle $\delta_b$ with the $m_2$ axis. It may be seen that if the amount of spherical magnification and the powers and angular orientations of the anamorphosers are correctly selected, that line A'''D''' of the final image parallelogram may be made to equal the dimension AD of the original image. It may also be seen that altering the original image ABCD to provide the resultant image A'''B'''C'''D''' has caused a rotation of the top line at infinity AD of the image through an angle $\rho$. It will be apparent from FIG. 10 that if original image ABCD were rotated clockwise through the angle $\rho$ as the magnification and primitive transformations were made, that the top line A'''D''' would lie parallel to top line AD of the original image. It will easily be understood from FIG. 10 that the sequence in which the various transformations are made is not critical. If the original image ABCD were not reduced in scale before the two primitive transformations are made, it will be realized that the two parallelograms of FIG. 10 would still have the same proportions and angles although the figures would be increased in size, and if the scale change were made after the first or second primitive transformation the final parallelogram image would be identical to that illustrated in FIG. 10. Thus the precise point in the system in which the scale change step of the invention is effected is not critical.

Assuming that lines AD and A'''D''' of FIG. 10 are of equal length as mentioned above, the following nine relationships may be written by means of elementary geometry:

$$\tan \beta = m_1 \tan \delta_a \quad (31)$$

$$\tan \delta_a = \frac{m_2}{\tan (\gamma_a + \theta)} \quad (32)$$

$$\tan \gamma_b = m_1 \tan \beta \quad (33)$$

$$m_2 \tan \delta_b = -\frac{1}{\tan (\gamma_b + \theta)} \quad (34)$$

$$\frac{h_2}{h_1} = -P_0 m_1 m_2 \frac{\sin \gamma_b}{\cos \beta} \frac{\cos \gamma_b}{\cos (\gamma_b + \theta)} \quad (35)$$

$$\cos \alpha = P_0 m_1 m_2 \frac{\cos \delta_a}{\sin \beta} \frac{\sin \gamma_a}{\sin (\gamma_a + \theta)} \quad (36)$$

$$\tan \alpha = \frac{d}{h_2} \quad (37)$$

$$\alpha = \delta_b - \delta_a \quad (38)$$

$$\rho = \delta_b + (90° - \theta) - \beta \quad (39)$$

Figure 1:
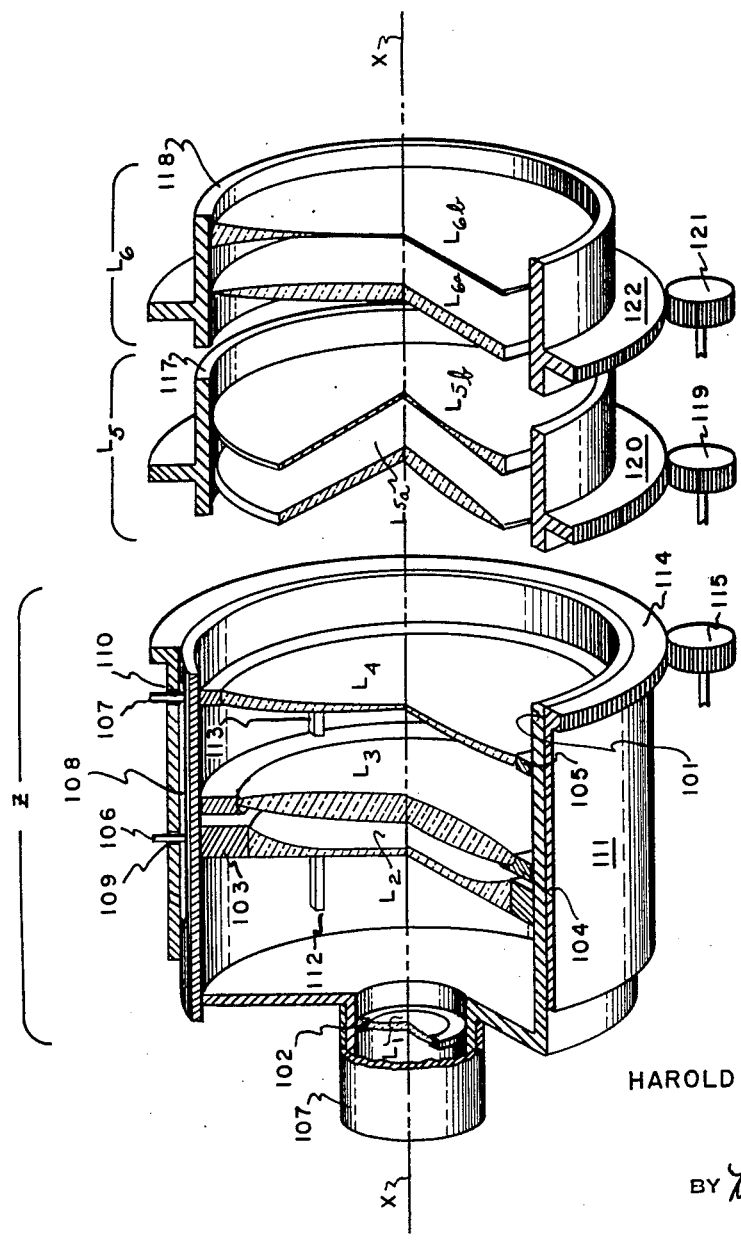
FIG. 1 is a perspective and sectional view with certain portions cut away of a preferred embodiment of optical apparatus of the invention, in which embodiment are utilized a variable power spherical lens and two fixed-power independently rotatable anamorphosers.

FIG. 4 shows graphically the values of $\beta$, $\theta$ and $P_0$ which should be used to provide desired viewpoint displacement with a system such as that shown in FIG. 1 in which two fixed power rotatable anamorphosers each having a power of 2.0 are used. In FIG. 4 abscissae represent lateral displacement and ordinates represent vertical displacement, each measured in the plane of the original viewpoint. If Equations 27 through 30 or Equations 31 through 39 are solved simultaneously for $\beta$, $\theta$, $P_0$ and $\rho$ (while setting $m_1$ and $m_2$ equal to 2.0), equations will result which may be plotted as in FIG. 4, where $h_1$, the height of the original image is assumed to be 5. Assume that an image of an area represents a scene viewed from an original viewpoint located at an altitude of 500 units at a particular point, and that it is desired to provide an image of the area such as would be seen from a desired viewpoint at an altitude of approximately 300 units and laterally displaced from the initial viewpoint; or as shown in FIG. 4, that it is desired to alter an image taken at point $P_1$ to be perspective from point $P_2$. FIG. 4 shows that the first anamorphoser of the apparatus of FIG. 1 should be adjusted to a $\beta$ angle of +30 degrees, the second anamorphoser should be adjusted to a $\theta$ angle of 60 degrees, the spherical magnification of the system should be approximately .395, and that a counter-rotation angle $\rho$ of approximately 10.5 degrees is necessary to maintain horizon lines of the original and altered images parallel. It will be appreciated that although FIG. 4 shows only partial plots of the equations, that the curves may be extended to show variation of the quantities over greater ranges of viewpoint displacement. Furthermore, it is not necessary in a system such as shown in FIG. 1 that the powers of the anamorphosers be set equal to 2.0, or even equal to each other. It is necessary, however, that the anamorphoser powers not be set equal to unity. Those skilled in the art will recognize that an anamorphoser having unity power is inoperative to affect an image. The anamorphosers may have fractional power as well as power greater than unity. Throughout the application, the terms "magnification" and "power" are intended to embrace powers less than unity as well as powers greater than unity. It will be simple in view of the above explanation for those skilled in the art to adopt other values of anamorphoser power and to construct charts of the nature of FIG. 4, so that optical apparatus may be adjusted manually to provide any desired viewpoint displacement.

From Equations 1 and 2 given above, it may be seen that an affine transformation from the $x_1$—$y_1$ plane to the $x_2$—$y_2$ plane may be represented by the equations:

$$x_2 = a_1 x_1 + b_1 y_1$$
$$y_2 = j_1 x_1 + k_1 y_1$$

having the determinant $$\Delta_1 = \begin{vmatrix} a_1 & b_1 \\ j_1 & k_1 \end{vmatrix}$$

A second transformation, from the $x_2$—$y_2$ plane to the $x_3$—$y_3$ plane may be represented by the equations:

$$x_3 = a_2 x_2 + b_2 y_2$$
$$y_3 = j_2 x_2 + k_2 y_2$$

having the determinant $$\Delta_2 = \begin{vmatrix} a_2 & b_2 \\ j_2 & k_2 \end{vmatrix}$$

The determinant of the equations representing a transformation from the $x_1 y_1$ plane to the $x_3$—$y_3$ plane will be the product of the individual determinants, or:

$$\Delta_{2,1} = \Delta_2 0 \Delta_1 = \begin{vmatrix} a_2 & b_2 \\ j_2 & k_2 \end{vmatrix} \cdot \begin{vmatrix} a_1 & b_1 \\ j_1 & k_1 \end{vmatrix} = \begin{vmatrix} a_1 a_2 + b_2 j_1 & a_2 b_1 + b_2 k_1 \\ a_1 j_2 + j_1 k_2 & b_1 j_2 + k_1 k_2 \end{vmatrix}$$

and the equations of such a transformation are:

$$x_3 = (a_1 a_2 + b_2 j_1) x_1 + (a_2 b_1 + b_2 k_1) y_1$$
$$y_3 = (a_1 j_2 + j_1 k_2) x_1 + (b_1 j_2 + k_1 k_2) y_1$$

If there are $n$ affine transformations made in going from an original image or $x_1$—$y_1$ plane to a resultant image or $x_n$—$y_n$ plane, the determinant of the equations for the resultant transformation is the product of the determinants of the individual sets of equations; or $$\Delta_{n-1} = \Delta_n \cdot \Delta_{n-1} \cdot \Delta_{n-2} \text{---------} \Delta_3 \cdot \Delta_2 \cdot \Delta_1$$

or $$\Delta_{n,1} = \begin{vmatrix} a_n & b_n \\ j_n & k_n \end{vmatrix} \cdot \begin{vmatrix} a_{n-1} & b_{n-1} \\ j_{n-1} & k_{n-1} \end{vmatrix} \text{----} \begin{vmatrix} a_2 & b_2 \\ j_2 & k_2 \end{vmatrix} \cdot \begin{vmatrix} a_1 & b_1 \\ j_1 & k_1 \end{vmatrix}$$

Let the product of the individual determinants be denominated $$\Delta_{n,1} = \begin{vmatrix} a_0 & b_0 \\ j_0 & k_0 \end{vmatrix}$$

If the resultant of the $n$th transformation is rotated clockwise through an angle $\rho$, it may be seen from Equations 27 through 30 that the following four general equations express the transformation of a rectangle to a parallelogram, i.e., the transformation of an original image to an image having an altered center of perspective:

$$\frac{1}{P_0} = a_0 \cos \rho + j_0 \sin \rho$$

$$0 = -a_0 \sin \rho + j_0 \cos \rho$$

$$\frac{d}{h_1 P_0} = b_0 \cos \rho + k_0 \sin \rho$$

$$\frac{h_2}{h_1 P_0} = -b_0 \sin \rho + k_0 \cos \rho$$

where $P_0$ equals system spherical magnification, and where $$a_1 = m_1 \sin^2 \beta_1 + \cos^2 \beta_1$$
$$b_1 = j_1 = (m_1 - 1) \sin \beta_1 \cos \beta_1$$
$$k_1 = \sin^2 \beta_1 + m_1 \cos^2 \beta_1$$

$$a_2 = m_2 \sin^2 \beta_2 + \cos^2 \beta_2$$
$$b_2 = j_2 = (m_2 - 1) \sin \beta_2 \cos \beta_2$$
$$k_2 = \sin^2 \beta_2 + m_2 \cos^2 \beta_2$$

$$a_n = m_n \sin^2 \beta_n + \cos^2 \beta_n$$
$$b_n = j_n = (m_{n-1}) \sin \beta_n \cos \beta_n$$
$$k_n = \sin^2 \beta_n + m_n \cos^2 \beta_n$$

$m_1$ = power of the first primitive transformation
$m_n$ = power of the $n$th primitive transformation
$\beta_1$ = the clockwise angle between reference vertical of the original image and the direction of power of the first primitive transformation.
$\beta_n$ = the clockwise angle between reference vertical of the original image and the direction of power of the $n$th primitive transformation For convenience, all anamorphoser angles are denominated $\beta$ with appropriate subscripts. Thus the angle $\beta_2$ equals $(\beta + \theta)$ if related to the specific equations. Since the axial rotation $\rho$ of the resultant image is an incidental effect rather than a quantity purposely caused to vary to alter the perspective of an image, and since such axial rotation may be unimportant in certain embodiments of the invention, it is sometimes desirable to utilize equations which do not include the term $\rho$. The four general expressions given above may be solved simultaneously to eliminate $\rho$, providing the three following expressions:

$$b_0 h_1 = a_0 d - j_0 h_2$$
$$k_0 h_1 = a_0 h_2 + j_0 d$$

$$\frac{h_2}{h_1} = (m_1 \cdot m_2 \ldots m_n) P_0^2$$

having the same determinant $$\begin{vmatrix} a_0 & b_0 \\ j_0 & k_0 \end{vmatrix}$$

as above.

From the above general expressions it will be seen that as well as the two-primitive transformation systems shown in detail, that the invention also embraces systems using more than two primitive transformations. By adding successive anamorphosers and establishing or controlling their powers and angular orientations in accordance with the general expressions given above, those skilled in the art will be enabled to construct an infinite number of embodiments of the invention. By expressing desired system restraints in equation form and solving such restraint equations simultaneously with the general expressions, simplified expressions may be obtained to provide a system incorporating the advantages of the particular restraint selected.

The term $P_0$ may be defined as the product of system spherical angular magnification and the ratio between projection distance to viewing distance. For example, if the invention is used to provide alteration of the perspective of a film image, $P_0$ may be written as follows:

$$P_0 = \frac{f_c}{f_p} \frac{d_L}{d_e}$$

$f_c$ = effective focal length of camera lens used to provide original image on film, including "wide angle" attachments, etc., if any.
$f_p$ = effective focal length of the projection lens system (exclusive of any effects produced by anamorphosers), including "wide angle" attachments, etc., if any.
$d_L$ = projection throw or distance.
$d_e$ = viewing distance.

Although FIG. 5b illustrates an arrangement in which the projection system is coincident with the viewpoint, it will be apparent that in actual practice of the invention the projector may be displaced therefrom provided an adjustment of focal lengths is made in accordance with the above expression.

FIG. 1 shows in perspective with certain portions cut away an embodiment of the invention utilizing a variable effective focal length spherical lens and two independently rotatable fixed power anamorphosers. Assume that the apparatus of FIG. 1 is inserted in a projection system, with the optical axis X—X coinciding with the projection system optical axis. The variable effective focal length spherical lens, or "zoom" lens as it is often called, is indicated generally at Z, and may comprise, for example, a focal version of the "zoom" lens shown in U.S. Patent Number 2,566,485. Such a "zoom" lens comprises a pair of negative spherical lenses $L_2$ and $L_4$ which are axially movable with respect to a pair of positive spherical lenses $L_1$ and $L_3$. All of the spherical lenses are carried within a cylindrical barrel 101. Positive lenses $L_1$ and $L_3$ are fixedly positioned within barrel 101 in mountings 102 and 104. Negative lenses $L_2$ and $L_4$ are carried in mountings 103 and 105, which are axially slidable within barrel 101 by means of cam pins 106 and 107. Cam pins 106 and 107 protrude through a straight longitudinal slot 108 cut in barrel 101 and through curved cam slots 109 and 110 cut in rotatable sleeve 111. Longitudinal keyways such as 112 and 113 may also be provided to further constrain the negative lenses against misalignment as they are axially positioned with respect to the fixed positive lenses. A toothed flange portion 114 of rotatable sleeve 111 is engaged by pinion 115, so that rotation of pinion 115 rotates sleeve 111 around stationary lens barrel 101, axially moving the negative lenses with respect to the positive lenses, and thereby changing the magnification or effective focal length of the "zoom" lens. The magnification of the system is designated as $P_0$ in the analysis heretofore given and in the control apparatus to be described, and the power variation of $P_0$ to provide viewpoint displacement to various points for a particular embodiment of the invention is shown graphically in FIG. 4.

Also provided in the optical system of FIG. 1 are two fixed power axially rotatable anamorphosers $L_5$ and $L_6$. The first anamorphoser is shown as comprising a positive cylindrical lens $L_{5a}$ and a negative cylindrical lens $L_{5b}$, both of which are fixedly mounted within a rotatable lens barrel 117. The second anamorphoser is shown as comprising a positive cylindrical lens $L_{6a}$ and a negative cylindrical lens $L_{6b}$, both of which are fixedly mounted in rotatable lens barrel 118. While I have shown anamorphosers comprised of two cylindrical lenses, it will be apparent to those skilled in the art that if desired, more than two cylindrical lenses may be employed to provide each fixed power anamorphoser. In general anamorphosers utilizing a minimum number of lenses are preferred to secure better light transmission. Fixed power anamorphoser $L_5$ is angularly positioned by means of pinion 119, which engages toothed flange portion 120 of barrel 117, and a fixed power anamorphoser $L_6$ is angularly positioned by means of pinion 121, which engages toothed portion 122 of barrel 118. In relation to FIG. 4 and control apparatus described in FIGS. 6 and 7, the anamorphic magnification of lens $L_5$ is designated as $m_1$ and the anamorphic magnification of lens $L_6$ is designated as $m_2$. The chart of FIG. 4 presumes that these magnifications are fixed at 2.0 power. It will be apparent to those skilled in the art that these magnifications may instead be fixed at other values, and that both anamorphosers need not have the same power in all embodiments of the invention. Rotation of pinion 119 positions anamorphoser $L_5$ at an angle designated $\beta$ and rotation of pinion 121 positions second anamorphoser $L_6$ at an angle designated as $\theta$ with respect to the power axis of the first anamorphoser, or designated $(\beta+\theta)$ with respect to space, or designated $\beta_2$ in the general equations. It will be apparent that pinions 115, 119 and 121 may be positioned manually in some embodiments of the invention as by providing control knobs or cranks and suitable dials or scales, so that values of $P_0$, $\beta$ and $\theta$ selected from a chart such as that of FIG. 4 may be entered to provide a desired viewpoint displacement. In continuous systems such as used for training displays, the values of $P_0$, $\beta$ and $\theta$ may be provided by a control apparatus to control automatically viewpoint displacement.

Figure 2:
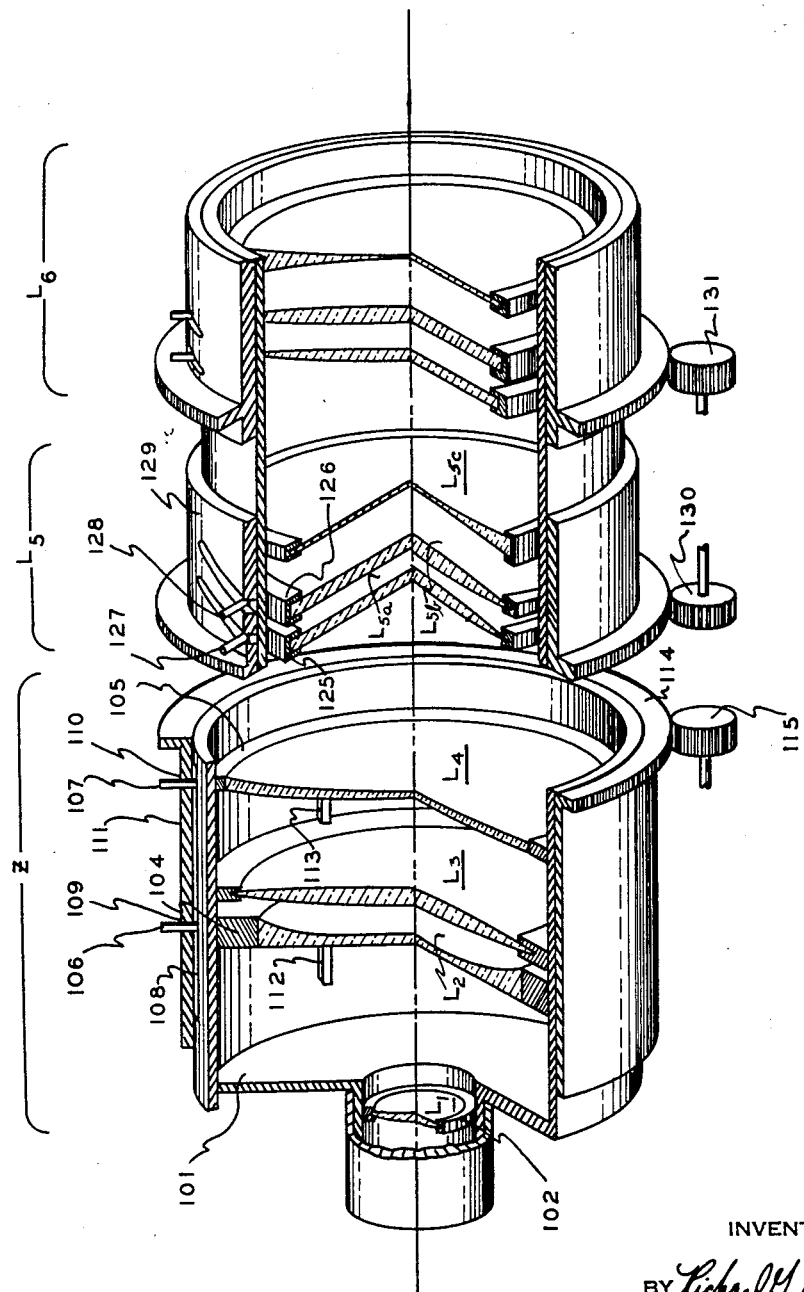
FIG. 2 is a perspective and sectional view with certain portions cut away of an alternative optical embodiment of the invention, in which embodiment are utilized a variable power spherical lens and two variable power anamorphosers which are not axially rotatable with respect to the image to be acted upon.

FIG. 2 shows in perspective with certain portions cut away an alternative embodiment of optical apparatus constructed to practice the invention. The apparatus of FIG. 2 is shown as comprising a variable effective focal length spherical or "zoom" lens indicated generally at Z and two variable power anamorphosers set at fixed angles. The zoom lens may be of the same type as that shown and described in connection with FIG. 1, and like numerals are utilized to designate like parts. The two variable power anamorphosers are each shown as comprising a negative cylindrical lens fixed in position and two positive cylindrical lenses axially movable with respect to the negative lens to vary the anamorphic magnification. The first anamorphoser, which is generally indicated at $L_5$ comprises fixed negative cylindrical lens $L_{5c}$ and axially movable positive cylindrical lenses $L_{5a}$ and $L_{5b}$. Positive lenses $L_{5a}$ and $L_{5b}$ are carried in mountings 125 and 126, respectively, and are moved by means of cam pins 127 and 128 as sleeve 129 is rotated by rotation of pinion 130. From the cutaway portions of lenses $L_{5a}$, $L_{5b}$ and $L_{5c}$ it will be seen that each of these lenses is cylindrical in the same direction. That axial movement of two positive cylindrical lenses with respect to a fixed negative cylindrical lens will provide variable power anamorphic magnification is shown and explained in detail in my copending application Serial Number 480,033 and need not be repeated herein. Furthermore, while I have shown variable power anamorphosers of this construction, other commercially available variable power anamorphosers may be utilized, as for example the "Ultra Panatar" and "Super-Panatar" types and the "Hi-Lux Val" type. The second anamorphoser, which is indicated generally as $L_6$, is shown as comprising elements similar to those of the first anamorphoser and hence need not be described in detail. However, it should be noted that the power axis of the second anamorphoser is rotated axially from the power axis of the first anamorphoser, so that operation of the anamorphosers stretch and compress an image in different directions. This angle between the power axes of the two anamorphosers is designated as $\theta$ in the analysis above. The angle of the power axis of the first anamorphoser with respect to space, or more specifically the angle between the power axis of the first anamorphoser and the vertical axis of the image acted upon by the system, is designated as $\beta$. As shown in FIG. 2, the angles $\beta$ and $\theta$ remain at fixed amounts at all times, and viewpoint displacement of the image is accomplished by varying $P_0$ by varying the power of zoom lens Z, and by varying the powers of the first and second anamorphosers.

Figure 3:
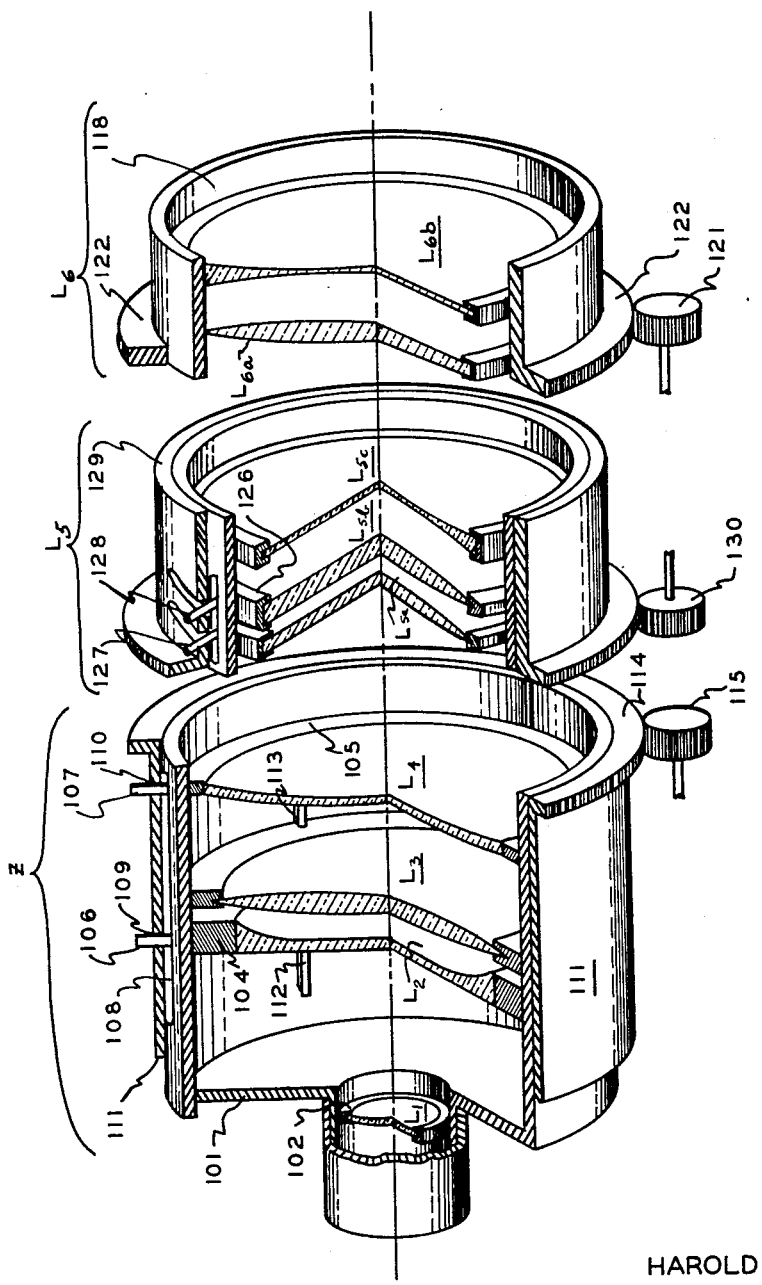
FIG. 3 is a perspective and sectional view of another embodiment of the invention in which a variable power spherical lens is used in conjunction with two anamorphosers, the first of which is adjustable in power and fixed in angular orientation, and the second of which is fixed in power but variable in angular orientation.

FIG. 3 shows in perspective with certain parts cut away an alternative embodiment of the invention utilizing a variable effective focal length or zoom lens indicated generally at Z, a variable power anamorphoser indicated generally at $L_5$ which is not angularly rotatable, and a fixed power anamorphoser indicated generally at $L_6$ which is rotatable. Since like parts are numbered corresponding to FIGS. 1 and 2, no detailed description of FIG. 3 is deemed necessary. Rotation of pinion 115 of FIG. 3 serves to vary the quantity $P_0$, rotation of pinion 130 serves to vary the quantity $m_1$ and rotation of pinion 121 serves to vary the angle $\theta$.

As well as the three embodiments of the invention exemplified by FIGS. 1, 2 and 3 there are several other embodiments which should be mentioned. It will be apparent from the analysis of FIG. 10 that the location of the zoom lens along the system optical axis with respect to the anamorphosers is a matter of choice. For example, in FIG. 3 the zoom lens could be located between or to the right of the anamorphosers if desired. Generally it is desirable in projection systems to use optical elements having many pieces of glass as near as possible to the object since such elements then may be made smaller in diameter. In this application I have designated the anamorphoser which ordinarily would be nearest to the film or other object in a projection system as the "first" anamorphoser, which has an anamorphic power of $m_1$, and which has its power axis arranged at an angle $\beta$ from a reference line of the object. In projecting outdoor scenes in which the vanishing point corresponds to the horizon, the reference line on the object is a line which is formed by the intersection of the viewpoint plane with a plane which is vertical with respect to the earth. Throughout the specification the anamorphoser which ordinarily would be further from the object has been termed the "second" anamorphoser, which has an anamorphic power of $m_2$, and which has its power axis arranged at an angle $\theta$ with respect to the power axis of the first anamorphoser.

It may be seen that in a system utilizing two anamorphosers and one zoom lens, there are five adjustments or "controllable parameters" of any embodiment which could be made variable. These are $P_0$, the spherical magnification of the system, $m_1$ and $\beta$, the power and angle of the first anamorphoser, and $m_2$ and $\theta$, the power and angle of the second anamorphoser. In any of the systems of the invention utilizing two primitive transformations and one scale change three of these parameters are made variable and two adjustments made constant, or more than three controllable parameters are made variable and an additional restraint is imposed on the system for each variable exceeding three. Hence the various systems of the invention using two primitive transformations and one scale change may be classified into the following basic types:

| Type | Variables | Constants | |
|---|---|---|---|
| I | $P_0, \beta, \theta$ | $m_1, m_2$ | Fig. 1. |
| II | $P_0, m_1, m_2$ | $\beta, \theta$ | Fig. 2. |
| III | $P_0, m_1, \theta$ | $\beta, m_2$ | Fig. 3. |
| IV | $P_0, \beta, m_2$ | $m_1, \theta$ | |

Each of the systems tabulated above may be altered in many different ways without departing from the invention by adding additional variables and adopting restraints. For example, the Type I system could be altered by also making $m_1$ variable and imposing an arbitrary restraint upon the system, such as $(\beta=\theta)$, or $(\beta+\theta=$a constant$)$ or $(\rho=0)$. It will be apparent that in particular embodiments of the invention the imposition of a particular restraint may serve to provide important advantages. For example, use of $\beta=\theta$ as a constant would allow both anamorphosers to be positioned angularly through suitable gearing by the same servo-motor or manual shaft input, the use of $(\beta+\theta=$a constant$)$ would allow the second anamorphoser to remain fixed with respect to the projector and object as viewpoint displacement is varied, and the use of $(\rho=0)$ as a restraint would make it unnecessary to rotate the object in space to maintain vanishing point portions of successive images coincident upon a screen or other surface. Since the basic system relationships are precisely defined by the expressions given in this specification, it is believed that those skilled in the art will be enabled to rearrange the equations for a system using any desired restraint, since it involves merely treating an additional physical quantity as a variable in the basic equations and solving such equations together with the equation which expresses the desired constraint.

The physical arrangement of a Type IV system will be apparent in view of the systems shown in FIGS. 1, 2 and 3. The Type IV system could utilize for example, means for rotating the first anamorphoser of the same nature as those shown in FIG. 3 for rotating the second anamorphoser, and means for varying the power of the second anamorphoser of the same nature as those shown in FIG. 3 for varying the power of the first anamorphoser.

It may occur to those skilled in the art that several other combinations of the variables could be devised. For example, a Type V system could utilize $P_0$, $m_1$, and $\beta$ as variables while maintaining $m_2$ and $\theta$ as constants, and a Type VI system could utilize $P_0$, $m_2$ and $\theta$ as variables while maintaining $m_1$ and $\beta$ as constants. In such a Type V system the second anamorphoser would be fixed in power and not angularly variable, and in a Type VI system the first anamorphoser would be fixed in power and not angularly variable. Hence such anamorphosers would be in a sense inactive and unnecessary and could be removed, since they would only provide fixed anamorphic magnification. System Types V and VI are, therefore, merely special embodiments of the invention shown and claimed in my copending application Serial Number 511,488 which shows systems using a variable power zoom lens and a variable power anamorphoser adjustable in angular orientation. It may be noted that further systems could be added to the above list by utilizing $P_0$ as a constant quantity. Any systems utilizing fixed system spherical magnification do not require a "zoom" lens. These further systems are described and claimed in my copending application Serial Number 548,841 filed on even date herewith and entitled "Image Alteration Method and Apparatus."

Although system limitations can in general be readily analyzed by those skilled in the art by consideration of the equations I have given herein, it may be well to mention a few characteristic limitations of some of the systems of the invention. Firstly, it will be immediately apparent that an anamorphoser having unity power is inoperative to have any effect in altering the perspective of an image, so that in system Types I, III and IV wherein fixed anamorphosers are provided, the power of such anamorphosers should not be set at unity if viewpoint displacement over an area is desired. In system Type II wherein the angular positions $\beta$ and $\theta$ of both anamorphosers are fixed, the angle $\theta$ must not be fixed at zero degrees, ninety degrees or integral multiples of those angles if displacement over an area is to be provided. Such angular positions of the second anamorphoser will provide displacement merely along two lines which intersect at the original viewpoint. The operation of a particular system in regard to the values of anamorphoser powers and angles and system $P_0$ required to provide a particular viewpoint displacement and the points within the viewpoint plane to which it is possible to displace the viewpoint may be seen most easily by constructing charts of the nature of FIG. 4.

Figure 6:
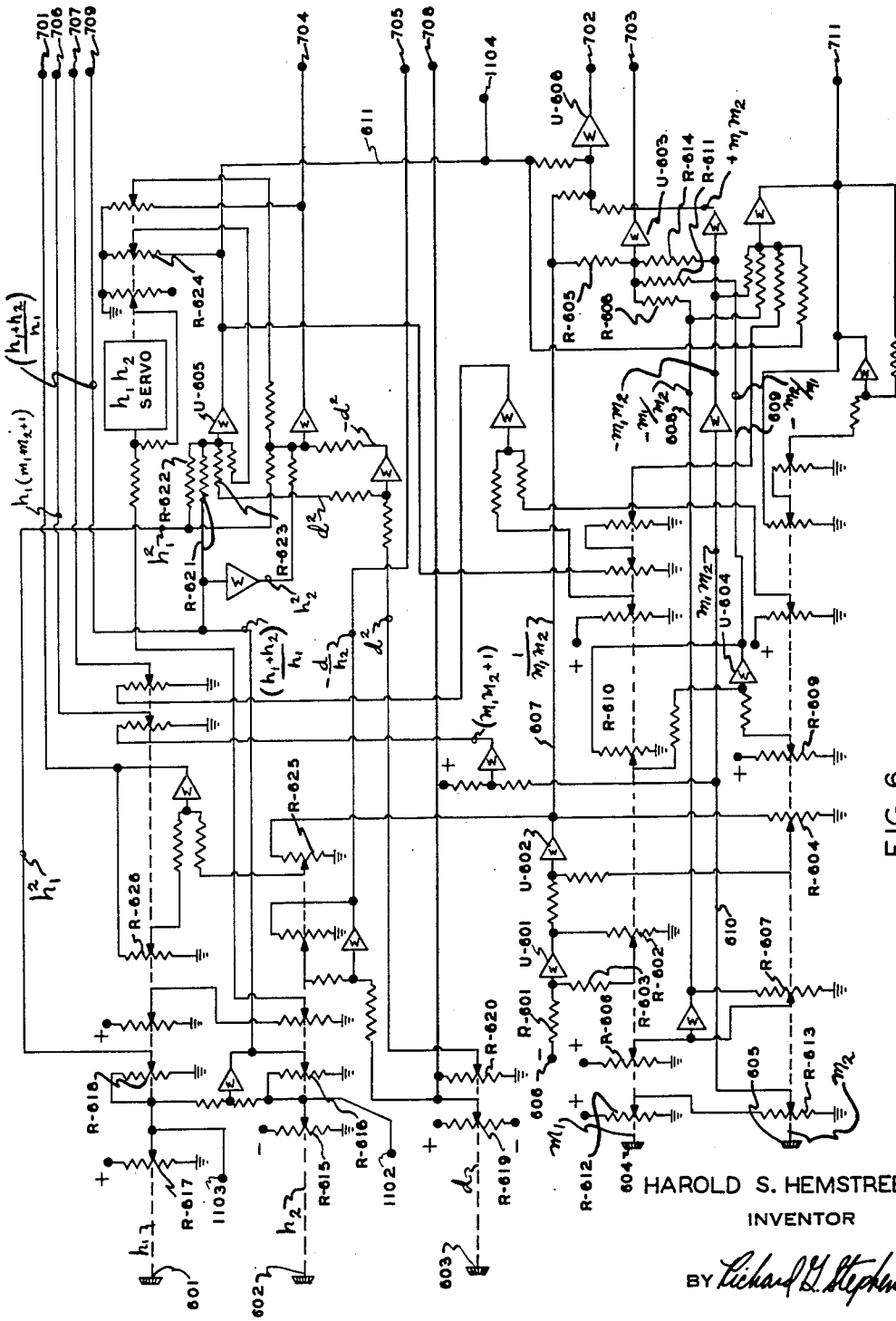

FIG. 6 shows in electrical schematic form an automatic computer control for adjusting apparatus such as that shown in FIG. 1 so that perspective alteration in accordance with a desired viewpoint may be produced. Shown at the left side of FIG. 6 are control knobs 601, 602 and 603, which are each mechanically connected to position the wiper arms of a plurality of potentiometers. Control knob 601 is positioned in accordance with the altitude (in the plane of the object) of the original image. If slides or motion picture film is used as the object, the setting of control knob $h_1$ should correspond to the altitude in the plane of the image from which the film or slide was taken. Control knob 602 is positioned in accordance with the altitude in the same plane of the desired viewpoint or desired center of perspective, and control knob 602 is positioned in accordance with the desired lateral displacement of the viewpoint. While I have shown the $h_1$, $h_2$ and $d$ inputs to the control computer as manually-positioned potentiometers, in many uses of the invention such inputs will comprise automatically derived control quantities. In my abovementioned copending applications Serial Numbers 480,033 and 500,325 I have shown apparatus suitable for use in conjunction with a conventional grounded trainer for automatically deriving these three input quantities.

Also shown at the left side of FIG. 6 are $m_1$ control knob 604 and $m_2$ control knob 605. These control knobs may be adjusted manually to correspond respectively to the powers of the first and second anamorphosers used in the apparatus of FIG. 1. A control computer constructed for use with a particular embodiment of FIG. 1 may, of course, utilize fixed resistances in place of the potentiometers varied by adjustment of control knobs 604 and 605 if anamorphosers of given fixed powers are always utilized in the optical apparatus. The function of the apparatus of FIG. 6 is to provide potentials which vary in accordance with desired viewpoint displacement in the correct manner so to position servomechanisms shown in FIG. 7. The servomechanisms are connected to position the optical apparatus of FIG. 1.

The following equations express the operation of a Type I system, and these Equations 40 through 43 result from analytic simultaneous solution of Equations 27 through 30 or solution of Equations 31 through 39. The control computer of FIGS. 6 and 7 comprises a straight forward analogue computer mechanization of these equations:

$$\sin^2 \theta = \frac{\frac{h_2^2 + d^2 + h_1^2}{h_1 h_2} - m_1 m_2 - \frac{1}{m_1 m_2}}{\frac{m_1}{m_2} + \frac{m_2}{m_1} - m_1 m_2 - \frac{1}{m_1 m_2}} \quad (40)$$

$$\left(\frac{h_1^2 - h_2^2 - d^2}{h_1 h_2}\right) \cos 2\beta - \frac{2d}{h_2} \sin 2\beta$$
$$= \frac{1}{1 - m_1^2}\left[(1 + m_1^2)\left(\frac{h_2^2 + h_1^2 + d^2}{h_1 h_2}\right) - 2m_1\left(m_2 + \frac{1}{m_2}\right)\right] \quad (41)$$

$$P_0^2 = \frac{h_2}{h_1} \frac{1}{m_1 m_2} \quad (42)$$

$$\left(\frac{h_1 + h_2}{h_1}\right) \cos \rho + \frac{d}{h_1} \sin \rho$$
$$= P_0[(m_1 m_2 + 1) \cos^2 \theta + (m_1 + m_2) \sin^2 \theta] \quad (43)$$

The $\theta$ servo of FIG. 7 solves Equation 40. A fixed potential from the computer power supply is applied at terminal 606 via summing resistance R-601 to summing amplifier U-601. The output potential of amplifier U-601 is multiplied by $m_1$ by means of potentiometer R-602 and applied via summing resistance R-603 to the input of amplifier U-601, so that the output potential of the amplifier will become proportional to $1/m_1$. This quantity is similarly divided by $m_2$ by means of potentiometer R-604 and amplifier U-602 to provide a potential proportional to the quantity $(-1/m_1 m_2)$ on conductor 607. This potential is applied via summing resistor R-605 to the input circuit of amplifier U-603. A potential proportional to the quantity $(-m_1/m_2)$ is derived by means of potentiometers R-606 and R-607 and applied via conductor 608 and summing resistance R-608 to amplifier U-603. A potential proportional to the quantity $(-m_2/m_1)$ is derived by means of potentiometers R-609 and R-610 and amplifier U-604 and applied via conductor 609 and resistance R-611 to amplifier U-603. A potential proportional to the quantity $(m_1 m_2)$ is derived by means of potentiometers R-612 and R-613 and applied via conducor 610 and resistance R-614 to amplifier U-603. The four potentials applied to the input circuit of amplifier U-603 will be seen to comprise a potential proportional to the denominator of the right side of Expression 40. This potential is applied via terminal 703 to excite sine resolvers R-711 and R-712 shown in FIG. 7. It will be apparent that in any system constructed for use with anamorphosers of particular powers, that the numerical value of the denominator of Expression 40 would be known, and the potential at terminal 703 could be provided by means of a single resistance connected to the computer power supply.

Potentials proportional to $h_2^2$, $h_1^2$ and $d^2$ are derived by means of potentiometers R-615 and R-616, R-617 and R-618, R-619 and R-620 and are applied to summing amplifier U-605 via resistances R-621, R-622 and R-623, respectively. The output of amplifier U-605 is multiplied by the quantity $(h_1 h_2)$ by means of potentiometer R-624 and fed back via resistance R-625 so that the resultant output on conductor 611 is proportional to $$\left(\frac{h_2^2 + h_1^2 + d^2}{h_1 h_2}\right)$$

This quantity is combined with the potentials from conductors 607 to provide at the output terminal 702 of amplifier U-606 a potential proportional to the numerator of Expression 40. The potential is applied via summing resistance R-709 to the input circuit of the $\theta$ servo to be summed with a potential from sine resolver R-712. It will be seen that the $\theta$ servo will continuously position itself to a null position, so that the angular position of the output shaft of the $\theta$ servo will be a measure of the angle $\theta$.

The $(1/m_1 m_2)$ potential in conductor 607 is multiplied by $h_2$ and $1/h_1$ by means of potentiometers R-625 and R-626 and applied via terminal 701 to the input circuit of the $P_0$ servo of FIG. 7. Potentiometers R-702 and R-703 provide a potential proportional to the square of the angular position of the output shaft of the $P_0$ servo, and this $P_0^2$ potential is summed with the potential applied via terminal 701. The $P_0$ servo continuously positions itself so as to minimize its input signal, providing an output shaft position which is a measure of $P_0$.

Inasmuch as the computer of FIGS. 6 and 7 is a straight-forward mechanization of Equations 40 through 43, it is believed that derivation of the input quantities to the $\beta$ and $\rho$ servos will now be apparent, so that no detailed description of the remainder of FIG. 6 is necessary. Potentials proportional to the following quantities are derived and connected to terminals 704, 705, 706, 707, 708, 709 and 711:

| Terminal | Potential |
| --- | --- |
| 704 | $\left(\frac{h_1^2 - h_2^2 - d^2}{h_1 h_2}\right)$ |
| 705 | $\frac{-d}{h_2}$ |
| 706 | $h_1(m_1 m_2 + 1)$ |
| 707 | $h_1(m_1 + m_2)$ |
| 708 | $d$ |
| 709 | $\frac{h_1 + h_2}{h_1}$ |
| 711 | $\frac{1}{(1 - m_1^2)}\left[(1 + m_1^2)\left(\frac{h_2^2 + h_1^2 + d^2}{h_1 h_2}\right) - 2m_1\left(m_2 + \frac{1}{m_2}\right)\right]$ |

The potential on terminal 705 is multiplied by $\sin^2$ by sine resolver R-706 and applied to the input circuit of the $2\beta$ servo via resistance R-708. The potential on terminal 704 is multiplied by $\cos 2\beta$ and applied to the input circuit of the $2\beta$ servo via summing resistance R-707. These potentials will be seen to be commensurate with the left-hand side of Expression 40. They are summed with the potential from terminal 711, which potential is proportional to the right side of Equation 41, and hence the $2\beta$ servo continuously positions itself so that its output shaft position is a measure of the angle $2\beta$. A 2:1 gear reduction 712 connected between the output shaft of the $2\beta$ servo and pinion 119 causes pinion 119 to be positioned in accordance with the angle $\beta$.

The potential at terminal 707 is multiplied by $P_0$ by means of potentiometer R-714, further multiplied by $\sin^2 \theta$ by means of resolvers R-718 and R-719 and applied via summing resistance R-720 to the input circuit of the $\rho$ servo. Similarly, the potential at terminal 706 is multiplied by $P_0$ by potentiometer R-713, further multiplied by $\cos^2 \theta$ by resolvers R-715 and R-716, and applied via resistance R-717 to the input circuit of the $\rho$ servo. It may be seen that the sum of these two inputs to the $\rho$ servo equals the right side of Expression 43 multiplied by $h_1$. Potentials proportional to the left side of Expression 43 multiplied by $h_1$ are applied to the $\rho$ servo via terminal 708 and sine resolver R-723, and via terminal 709 and cosine resolver R-721, so that the $\rho$ servo will continuously position itself to provide a shaft output commensurate with the angle $\rho$.

It may be noted that the $P_0$ servo, the $2\beta$ servo and the $\theta$ servo are each positioned by potentials from the apparatus of FIG. 6 which are functions of the independent variable inputs $h_1$, $h_2$ and $d$ and the known quantities $m_1$ and $m_2$, and hence the position of any one of these three servos is not dependent upon the position of the others. Although the $\rho$ servo input potentials depend upon the positions of the $P_0$ and $\theta$ servos the converse is not true. Thus solving analytically for the control quantities $P_0$, $\beta$, and $\theta$ in terms of the independent variables allows construction of a servo system in which all servos are easily stabilized. Those skilled in the art will recognize that the servo systems of FIG. 7 are solving quadratic equations, and hence the proper direction of rotation for a given polarity input must be selected in order for the servos to select the proper root of each quadratic equation.

Thus it will be seen that as desired viewpoint displacement is varied by variation of the $h_2$ and $d$ inputs of FIG. 6, the servos of FIG. 7 will continuously position pinions 115, 119 and 121 so that the optical apparatus of FIG. 1 will provide the desired change in perspective of the image. If it is desired to maintain horizon portions of the image level or in any particular angular position as viewpoint displacement is varied, the output of the $\rho$ servo may be used to rotate the object and entire distortion apparatus axially, or to rotate the viewing screen or other surface relative to the projection apparatus in those cases in which the angular orientation of the altered image in space is not important.

Figure 11:
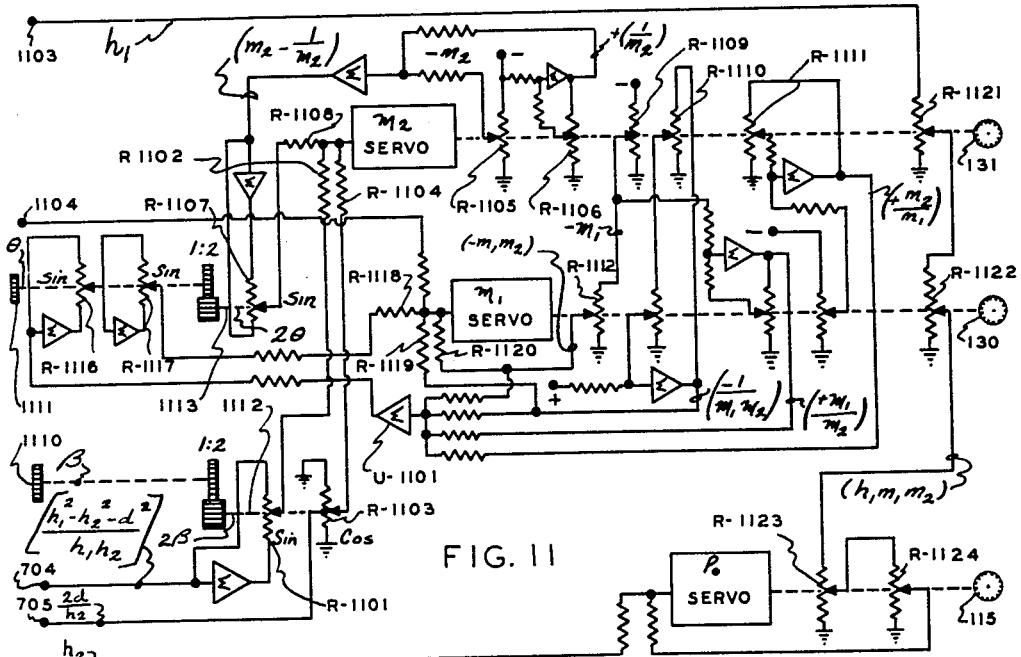
FIG. 11 is an electrical schematic diagram of an exemplary controller for operating apparatus such as that shown in FIG. 2.

Shown in electrical schematic form in FIG. 11 is a computer control suitable for use in operating automatically basic Type II systems constructed in accordance with the invention. Various potentials which are functions of the independent variables $h_1$, $h_2$ and $d$ may be derived as shown in FIG. 6 and provided at terminals 704, 705, 1102, 1103 and 1104. Since basic Type II systems utilize anamorphosers which are not rotatable with respect to the image nor with respect to each other, the angles $\beta$ and $\theta$ are constant, and $\beta$ and $\theta$ control shafts positionable by means of control knobs 1110 and 1111 are shown in FIG. 11. Both of these control shafts are provided with a 1:2 gear reduction so as to provide $2\beta$ and $2\theta$ shafts 1112 and 1113. Potentiometers having their wiper arms positioned in accordance with $\beta$, $\theta$, $2\beta$ and $2\theta$ are shown as being positioned by the four abovementioned manually-settable control shafts. It will be apparent that in constructing a computer for use with a specific Type II embodiment of the invention, that each of these potentiometers may be replaced by a fixed resistor.

The $m_2$ servo shown in FIG. 11 solves the following expression:

$$\left(m_2 - \frac{1}{m_2}\right)\sin 2\theta = \left(\frac{h_1^2 - h_2^2 - d^2}{h_1 h_2}\right) \sin 2\beta + 2\frac{d}{h_2} \cos 2\beta \quad (44)$$

The potential available at terminal 704 is multiplied by $\sin 2\beta$ by means of resolver R-1101 and applied to the input circuit of the $m_2$ servo via summing resistance R-1102. The potential available at terminal 705 is multiplied by $\cos 2\beta$ by means of potentiometer R-1103 and applied to the input circuit of the $m_2$ servo via resistor R-1104. It will be seen that these potentials represent the right hand side of the above expression. A potential commensurate with the left hand side of Equation 44 derived in conventional manner by means of potentiometers R-1105, R-1106 and R-1107, and applied to the input circuit of the $m_2$ servo via summing resistance R-1108. As will be apparent the $m_2$ servo will rotate until the sum of its applied input potentials becomes zero, at which time the shaft position of the servo will be a measure of $m_2$, the required power of the second anamorphoser. The $m_2$ servo may be mechanically connected as shown to position the arms of a plurality of other potentiometers and to drive pinion 131, providing the desired second anamorphoser setting. It may be noted that each of the terms of Equation 44 is either an independent variable input term ($d$, $h_1$ or $h_2$) or a known term ($\beta$ or $\theta$), so that input potentials derived to position the $m_2$ servo do not depend upon the balance of any of the other servos of FIG. 11.

The $m_1$ servo of FIG. 11 solves Expression 40. A potential commensurate with the denominator of the right-hand side of Equation 40 is derived by means of potentiometers R—1109 through R—1115 and by summing amplifier U-1101. This potential is multiplied by $\sin^2 \theta$ by means of resolvers R-1116 and R-1117 and applied to the input of the $m_1$ servo via summing resistance R-1118. Potentials proportional to the numerator of Expression 40 are applied to the input circuit of the $m_1$ servo via summing resistances R-1119 and R-1120. Hence it will be understood that the $m_1$ servo will rotate until its shaft output position is a measure of the required power $m_1$ of the first anamorphoser. Although the $m_1$ servo input potentials depend upon the balance of the $m_2$ servo, the $m_2$ servo input potentials are independent of the $m_1$ servo balance, so that both servos may be stabilized using conventional techniques. The $m_1$ servo output shaft positions the arms of a plurality of potentiometers as shown in FIG. 11, and also positions pinion 130, providing the required first anamorphoser power as shown in FIG. 2. The $P_0$ servo of FIG. 11 solves Expression 42, the inputs to this servo being supplied from terminals 1102 and 1103, and from potentiometers R-1121 through R-1124. It may be seen that the input potentials applied to the $P_0$ servo depend upon balance of the $m_1$ and $m_2$ servos, but since these two anamorphoser power servos are not dependent upon balance of the $P_0$ servo, the latter servo may be stabilized by conventional means. The output shaft of the $P_0$ servo may adjust the variable effective focal length lens of FIG. 2 by means of pinion 115 to provide the desired spherical magnification. Hence it will be seen that the apparatus of FIG. 11 may control Type II apparatus such as shown in FIG. 2 to provide the two primitive transformations and the spherical magnification required to provide a desired viewpoint displacement. If desired, a $\rho$ servo (not shown) may be utilized with the apparatus of FIG. 11 to provide a counter-rotation of the image. Such a $\rho$ servo may be connected to receive inputs derived in the same manner as those applied to the $\rho$ servo of FIG. 7.

Figure 12:
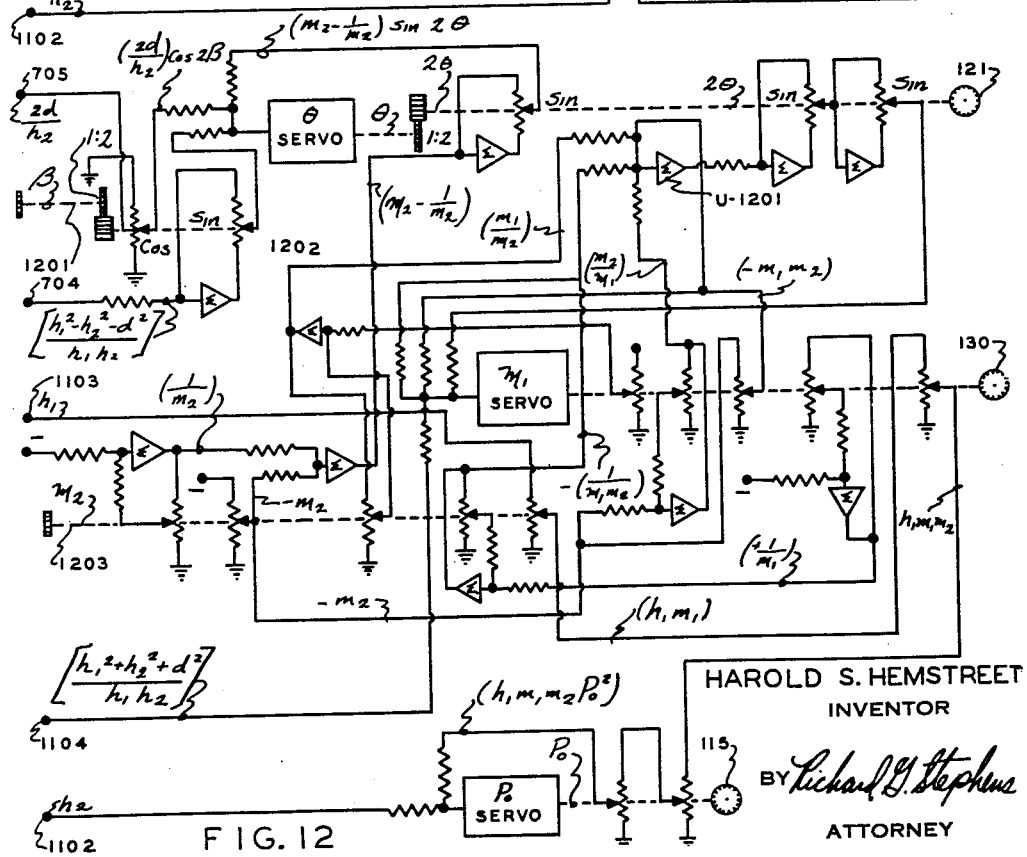
FIG. 12 is an electrical schematic diagram of an exemplary controller for operating apparatus such as that shown in FIG. 3.

Shown in electrical schematic form in FIG. 12 is a computer control suitable for operating automatically basic Type III systems, constructed in accordance with the invention. Like FIG. 11, the apparatus of FIG. 12 utilizes input potentials which are functions of the independent variables ($d$, $h_1$, $h_2$) defining desired viewpoint displacement, and which potentials may be derived as shown in FIG. 6 by conventional analog computer techniques. Since basic Type III systems utilize a first anamorphoser fixed in angular position and a second anamorphoser fixed in power ($\beta$, $m_2$ constant), control knobs are provided to position shafts 1201 and 1202 at desired $\beta$ and $2\beta$ angles and to position shaft 1203 at a desired value of second anamorphoser power $m_2$. If the apparatus of FIG. 12 is designed for use with a particular embodiment always using the same first anamorphoser angle and the same second anamorphoser power, each of the variable resistances controlled by these manually-positionable shafts may be replaced by a fixed resistor. The $\theta$ servo of FIG. 12 solves Expression 44, and since this expression contains only $\beta$ and $m_2$ terms in addition to the independent variable input functions, it will be seen that the $\theta$ servo balance is entirely independent of the balance of any of the other servos of FIG. 12. The output shaft of the $\theta$ servo positions the arms of a plurality of potentiometers as shown, and also positions pinion 121 to adjust the angle of the second anamorphoser with respect to the axis of the first anamorphoser. The $m_1$ servo solves Equation 40, its input potentials being derived in a manner which will be apparent now to those skilled in the art. The output shaft position of the $m_1$ servo of FIG. 12 may be used to position pinion 130 to adjust the power of the first anamorphoser of FIG. 3. The $P_0$ servo of FIG. 12 solves Expression 42, providing a shaft output suitable to provide the spherical power $P_0$ via pinion 115 of FIG. 3. A $\rho$ servo (not shown) may be connected to rotate the object with respect to the apparatus of FIG. 3 if it is considered desirable to maintain horizon line portions of successive images parallel, and the proper connection of a $\rho$ servo similar to that of FIG. 7 will be readily apparent to those skilled in the art.

Figure 13:
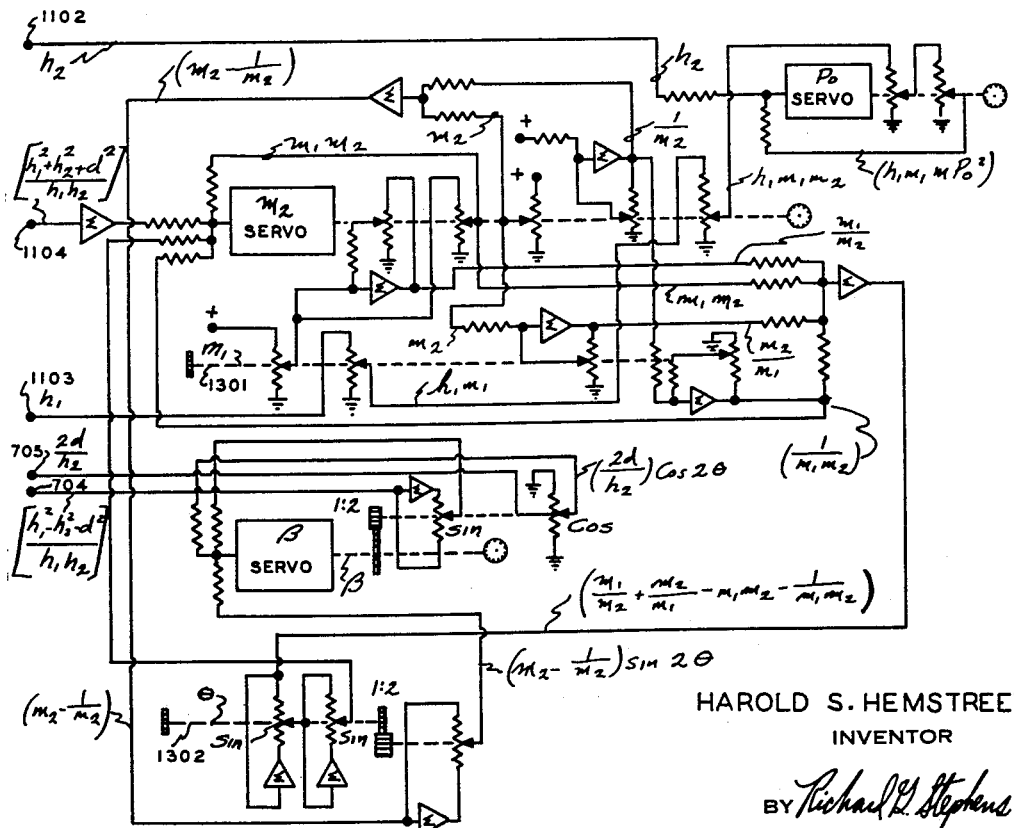
FIG. 13 is an electrical schematic diagram of an exemplary controller for operating apparatus such as that designated as a Type IV system.

FIG. 13 shows in schematic form a computer control suitable for automatically operating basic Type IV systems constructed in accordance with the invention. Like FIGS. 11 and 12, the apparatus of FIG. 13 utilizes input potentials which are functions of the independent variables ($d$, $h_1$, $h_2$) defining desired viewpoint displacement, which potentials may be derived as shown in FIG. 6 by conventional analog computer techniques. Since basic Type IV systems utilize a first anamorphoser fixed in power and a second anamorphoser fixed against rotation with respect to the first anamorphoser, manually positionable control shafts 1301 and 1302 are provided. If the computer of FIG. 13 is designed for use with apparatus having specific first anamorphoser power and the second anamorphoser angle (with respect to the first anamorphoser), the variable impedances controlled by shafts 1301 and 1302 may be replaced by fixed resistors. The $m_2$ servo of FIG. 13 solves Expression 40. Since Expression 40 contains no $\beta$ or $P_0$ terms, it will be seen that the $m_2$ servo of FIG. 13 is not dependent upon the balance of the $\beta$ or $P_0$ servos of FIG. 13 and may be stabilized by conventional techniques. The $\beta$ servo of FIG. 13 solves Equation 44 and the $P_0$ servo of FIG. 13 solves Equation 42, each being connected as shown in FIG. 13, and operating in a manner which will be apparent now to those skilled in the art. A $\rho$ servo may be added to the apparatus of FIG. 13, if desired.

Figure 14:
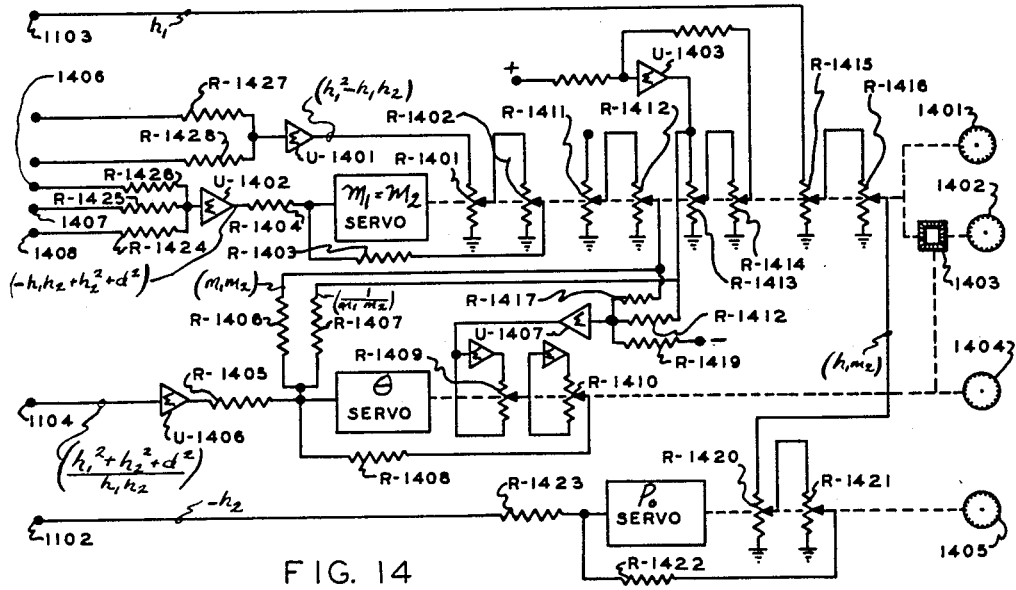
FIG. 14 is an electrical schematic diagram of an exemplary controller for operating an embodiment of the invention which utilizes an arbitrary restraint.

Shown in FIG. 14 is an exemplary control computer which may be used for operating an embodiment of the invention in which two variable power anamorphosers and a zoom lens are used and in which an arbitrary restraint is imposed upon the system. The computer shown in FIG. 14 utilizes the restraint $m_1=m_2$; or, in other words, the powers of the first and second anamorphosers are constrained to remain equal as such powers are varied. It will be apparent that use of such a system will enable both anamorphosers to be adjusted by the same servomotor, if desired. The addition of the arbitrary restraint necessitates making one more of the five control quantities variable as mentioned above, so that the system of FIG. 14 may be considered as either a modified Type II system ($\beta$, $\theta$ constant) in which $\theta$, the angle of the second anamorphoser has been made variable because of the added restraint, or as a modified Type III system ($\beta$, $m_2$ constant) in which $m_2$, the power of the second anamorphoser has been made variable because of the added restraint. In FIG. 14, the angle $\beta$, which expresses the angular position of the first anamorphoser is maintained constant, and for the specific example of FIG. 14, the angle $\beta$ has been assumed to be set at zero degrees; or, in other words, with the power axis of the first anamorphoser always acting along the vertical axis of the original image. It is not at all necessary, however, that $\beta$ be set to zero degrees, and such a setting has been assumed herein because it simplifies the equations which must be solved to control the system.

If the restraint equation ($m_1=m_2$) is solved simultaneously along with Equations 31 through 39 given above with an assumed value for $\beta$ of zero degrees, the following two new expressions may be obtained:

$$m_1{}^2 = m_2{}^2 = \frac{h_1 h_2 - h_2{}^2 + d^2}{h_1{}^2 - h_1 h_2}$$

$$\sin^2 \theta = \frac{\dfrac{h_1{}^2 + h_2{}^2 + d^2}{h_1 h_2} - m_1{}^2 - \dfrac{1}{m_1{}^2}}{2 - m_1{}^2 - \dfrac{1}{m_1{}^2}}$$

Eliminating fractions in the above equations:

$$m_1{}^2(h_1{}^2 - h_1 h_2) = h_1 h_2 - h_2{}^2 - d^2 \qquad (44a)$$

$$\sin^2 \theta (2 - m_1{}^2 - m_1{}^2) = \frac{h_1{}^2 + h_2{}^2 + d^2}{h_1 h_2} - m_1{}^2 - \frac{1}{m_1{}^2} \qquad (45)$$

It will be noted that Equation 44a expresses the required power of the first anamorphoser (and also the second, since $m_1=m_2$) in terms of the independent variable input quantities $h_1$, $h_2$ and $d$. An $m_1=m_2$ servo shown in block form in FIG. 14 solves Equation 44, providing a shaft output to control the powers of the first and second anamorphosers. Potentials commensurate with the independent variable input quantities may be derived by apparatus such as that shown in FIG. 6 and applied via summing resistors R–1427 and R–1428 to summing amplifier U–1401 so to provide an output from said amplifier commensurate with the bracketed quantity on the left hand side of Equation 44a. This quantity is modified or multiplied by $m_1{}^2$ by potentiometers R–1401 and R–1402, the arms of which are positioned by the $m_1=m_2$ servo, so that an input potential proportional to the left hand side of Equation 44a is applied to the input of the $m_1=m_2$ servo via summing resistor R–1403. Independent variable input quantities proportional to $h_1 h_2$, $-h_2{}^2$ and $-d^2$ may be derived by apparatus similar to that of FIG. 6 and added in summing amplifier U–1402 to provide a servo input potential via summing resistor R–1404 commensurate with the right hand side of Expression 44a. As will be apparent the $m_1=m_2$ servo will rotate until these inputs exactly cancel each other, at which time the servo output shaft will be in a position corresponding to the required values of $m_1$ and $m_2$. A $\theta$ servo shown in FIG. 14 solves Equation 45. A potential commensurate with the quantity $$\frac{h_1{}^2 + h_2{}^2 + d^2}{h_1 h_2}$$

derived as shown in FIG. 6 is applied via terminal 1104 and summing resistor R–1405. Potentials proportional to the other terms in the right hand side of Equation 45 are derived by potentiometers R–1411 and R–1412 and by potentiometers R–1413 and R–1414 and applied via summing resistors R–1406 and R–1407. A potential commensurate with the bracketed quantity is applied from summing amplifier U–1407 and multiplied by $\sin^2$ by resolver potentiometers R–1409 and R–1410 to provide an input via summing resistor R–1408 proportional to the left hand side of Equation 45. A $P_0$ servo is shown connected to solve Equation 42 in substantially the same manner as shown in previous embodiments of the invention. The output shaft of the $P_0$ servo may vary the system spherical magnification, and the output shaft of the $\theta$ servo may vary the angular orientation of the second anamorphoser with respect to the first anamorphoser and the original image. The output shaft of the $m_1=m_2$ servo is shown connected directly to a pinion 1401 which may vary the power of the first anamorphoser, which is angularly fixed with respect to the original image. Since such shaft may not also be used directly to vary the power of the rotating second anamorphoser, the relative angular rotation $\theta$ between the first and second anamorphosers is fed into a summing device shown as comprising mechanical differential 1403, so that the power of the second anamorphoser is adjusted in accordance with the quantity $m_2$.

In each of the computers shown in FIGS. 11 through 14, it may be seen that no servos are connected in closed loops involving other servos, so that each servo may be stabilized independently by conventional techniques. Also, each of these figures shows how to mechanize certain equations so as to provide the quantities $m_1$, $m_2$, $\beta$, $\theta$ and $P_0$ as shaft positions where some of the quantities are unknown. If a rotational correction is desired, a $\rho$ servo (not shown) may be added to any of the computers. Having $m_1$, $m_2$, $P_0$ and $\theta$ available as shaft positions, it will be apparent to those skilled in the art that such $\rho$ servos may be connected, for example, to solve Equation 43 in exactly the same manner as the $\rho$ servo of FIG. 7.

As mentioned above, the computer mechanization of the equations is done in conventional manner, using standard analogue computer techniques. Each of the servos shown above and those to be described below may comprise conventional analogue computer servos of the types widely used in the aviation, fire control, navigation and grounded trainer arts. Either alternating or direct current carriers may be used. Digital computer solution of the equations may be used if desired. Each servo may be provided with a tachometer generator or other rate feedback device to stabilize its operation, as well as with mechanical or electrical limits, gear reducers, and other details well known in the art. Many polarity inversion and buffer amplifiers have been omitted for sake of clarity. Resolvers have been shown as simple potentiometers for convenience of illustration. Conventional feedback amplifiers have been shown as summing means, but those skilled in the art will recognize that either parallel or series addition may be used. Furthermore, while electrical analogue computation is illustrated, those skilled in the art will recognize that a wide range of equivalent mechanical, hydraulic and pneumatic computing elements may be substituted for those shown without departing from the invention.

Figure 9:
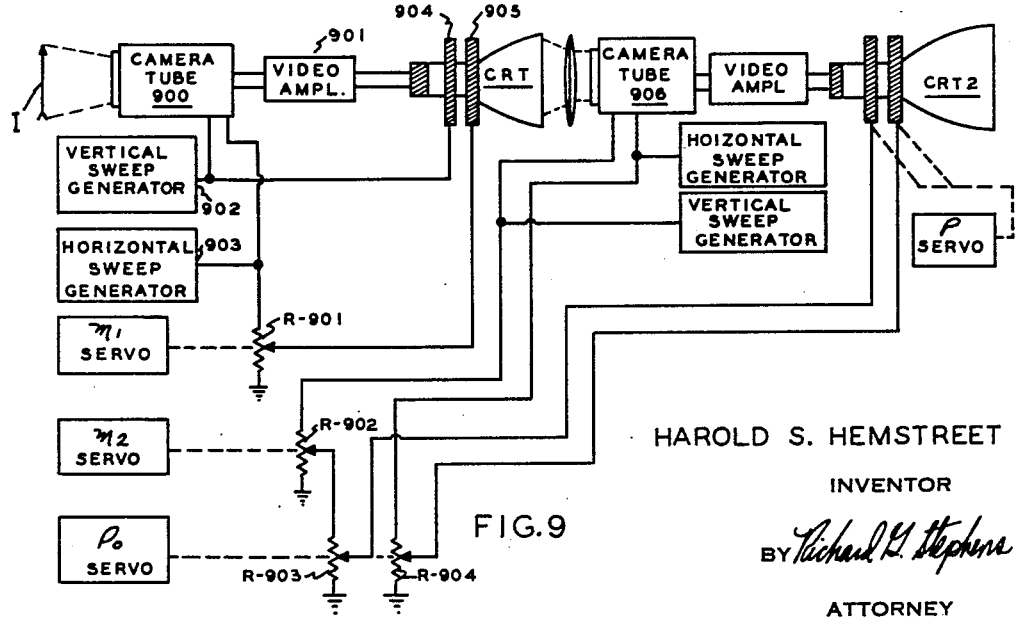
FIG. 9 is an electrical schematic diagram partially in block form illustrating how the invention may be practiced to alter the apparent perspective of an image electrically.

The method of the invention may be practiced electrically as well as optically, and if desired systems combining both types of operation may be devised. FIG. 9 is an electrical schematic diagram partially in block form which illustrates another manner in which an image may be altered in perspective. An image to be altered is indicated by the arrow I. This image is scanned by a conventional television "pickup" or camera tube 900, providing video output signals which are amplified in amplifying stages 901 and applied between grid and cathode of a conventional cathode ray tube CRT–1. Vertical and horizontal scanning signals for camera tube 900 and cathode ray tube CRT–1 are provided by conventional sawtooth sweep generators 902 and 903. The sweep potential from vertical sweep generator 902 is applied directly to both camera tube 900 and the vertical deflection coil of cathode ray tube CRT–1. The sweep potential from horizontal sweep generator 903 is applied directly to the horizontal sweep circuit of camera tube 900, but is applied to the horizontal deflection coil 905 of picture tube CRT–1 through potentiometer R–901, the arm of which is positioned by an $m_1$ servo. It will be seen that since the sweep circuits of camera tube 900 and picture tube CRT–1 are synchronized, that a replica of image I will appear on the face of CRT–1, although the "horizontal" dimension of the image may be larger or smaller than normal, depending upon the setting of potentiometer R–901. If the magnitude of the horizontal sweep potential applied to CRT–1 is varied while maintaining vertical sweep potentials of equal magnitude, it will be seen that the image on the face of CRT–1 will be provided with a primitive transformation of varying power along the "horizontal" axis of the picture tube. Therefore, if a servo is provided to position potentiometer R–901 so as to vary the magnitude of the horizontal sweep potential applied to CRT–1, a picture will be obtained having the same appearance as that obtained by use of an optical anamorphoser. In FIG. 9 a second primitive transformation is applied to the image by camera tube 906, picture tube CRT–2 and associated apparatus, and a scale change or spherical magnification is also applied. The second primitive transformation is obtained by varying the amplitude of the vertical sweep potentials applied to picture tube CRT–2 by means of potentiometer R–902 and the $m_2$ servo. The spherical magnification or scale change is provided by varying equally the amplitudes of both sweep potentials applied to CRT–2. As shown in FIG. 9, variation of both sweep potentials is accomplished by potentiometers R–903 and R–904, the arms of which are positioned in accordance with a required spherical magnification by the $P_0$ servo. A rotation is applied to the transmitted image by means of the $\rho$ servo, which axially rotates the deflection coils of CRT–2 about the neck of the tube, thereby rotating the picture formed on the face of CRT–2. Thus it may be seen that the resultant image provided on the face of CRT–2 will correspond to the original image I with two primitive transformations, a scale change and a rotation, so that by properly providing such changes in the original image one may provide a resultant image on the face of CRT–2 which corresponds to the original image I with a desired alteration in perspective. The image on the face of picture tube CRT–2 may be cast on a screen by means of a projection lens if desired. The system of FIG. 9 requires $m_1$, $m_2$, $P_0$, and $\rho$ servos of the same type described above for use with the apparatus of FIG. 2, wherein the angles $\beta$ and $\theta$ were maintained constant. Although I have shown the spherical magnification in FIG. 9 accomplished by equally modifying the horizontal and vertical sweep amplitudes of the second picture tube, it is immaterial whether the required spherical magnification is introduced before or after any particular other transformation, so that it should be apparent that potentiometers R–903 and R–904 could be connected to vary the sweep potentials of CRT–1 instead of CRT–2 if desired. Furthermore, the spherical magnification could instead be made by varying the sweep potentials of a further picture tube (not shown) connected to receive video signals from a further camera tube (not shown) disposed to scan the face of CRT–2.

The angle $\beta$ in FIG. 9 is the angle between the vertical axis of the image I and the direction of "horizontal" sweep of camera tube 900, and the angle $\theta$ is the angle between the "vertical" sweep direction of camera tube 906 and the direction in the picture on the face of CRT–1 corresponding to the "horizontal" sweep direction of camera tube 900. Thus it may be seen that FIG. 9 is an electrical system of Type II, wherein $m_1$, $m_2$, $P_0$ (and $p$, if desired) are varied while $\beta$ and $\theta$ are maintained constant. It should now be apparent to those skilled in the art, that the other type systems may be constructed to operate electrically. For example, a Type I system may be constructed by providing two primitive transformations fixed in magnitude but varying angularly in addition to a spherical magnification (and roation, if desired). If vertical and horizontal sweep potentials of a given fixed ratio are applied to the coils of a cathode ray tube, and if such ratio differs from the ratio of the sweep potentials applied to the camera tube feeding video signals to such a cathode ray tube, a primitive transformation will occur in the picture cast on the face of the cathode ray tube. It will be apparent that, if desired, two successive primitive transformations may be made in this manner. Now, if the magnitudes of the sweep potentials applied to one or both of the picture tubes are varied while maintaining the ratio between horizontal sweep magnitude and vertical sweep magnitude, it will be seen that a scale change or spherical magnification will result. This may be done for example, as in FIG. 9 by means of a $P_0$ servo. In constructing an electrical system of Type I, a $\beta$ servo may be provided to rotate axially camera tube 900 with respect to image I, and a $\theta$ servo may be provided in addition to rotate camera tube 906 either through the angle $(\beta+\theta)$ with respect to space if picture tube CRT–1 is not rotated through the angle $\beta$, or to rotate camera tube 906 through the angle $\theta$ if picture tube CRT–1 is rotated along with camera tube 900 through the angle $\beta$. If picture tube CRT–1 is stationarily mounted, the $(\beta+\theta)$ shaft position needed to position camera tube 906 may be derived by summing the outputs from the $\beta$ and $\theta$ servos with a mechanical differential or equivalent. While I have shown electrical systems in which successive camera tube sawtooth sweep potentials are maintained constant in magnitude and picture tube sweep potentials are varied in order to provide primitive or spherical magnifications, it should be noted that the magnifications are provided by the relative amplitudes between camera sweep and picture tube sweep, and the same magnifications may be made by altering camera tube sweep potential magnitudes while maintaining successive picture tube sweep potentials constant. Such systems require, however, that the camera tube sweep potentials be varied in accordance with the inverse function. For example, if the first primitive transformation in FIG. 9 were to be made with the sweep potentials between camera tube and deflection coils 904 and 905 interchanged, the $m_1$ servo controlling potentiometer R–901 should actually provide an output quantity commensurate with $1/m_1$. Those skilled in the analog computer art will readily recognize how the $m_1$ servo may be connected to provide such an output quantity, so no detailed explanation is deemed necessary.

It should be emphasized that the system relationships which are described principally by the equations given herein may be expressed in an infinite number of different forms merely by performing simple algebraic manipulation, and that computers or controllers may be constructed in accordance with conventional and well-known computer techniques to solve such modified equations. It will also be recognized that in certain embodiments of the invention various terms of the equations will have little effect over particular areas of viewpoint displacement, so that such terms may be dropped from the equation in constructing embodiments of the invention to operate over limited areas.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Apparatus for altering an original image of an object as said object appears when viewed from a first angle to provide a resultant image simulating the appearance of the same object viewed from a different angle, comprising in combination, first and second primitive transformation means and uniform magnification means arranged to act upon said original image, the powers and angular orientations of said primitive transformation means and the power of said uniform magnification means constituting adjustable parameters, drive means for adjusting a plurality of said adjustable parameters, and computer means providing signals to control said drive means in accordance with desired changes in viewing angle, said signals being so determined by said computer means that each point of said resultant image will be displaced with respect to the corresponding point of said original image by an amount proportional to the distance of said corresponding point from the horizon of said original image.

2. Apparatus according to claim 1 in which the others of said adjustable parameters than those adjusted by said drive means are maintained constant.

3. Apparatus according to claim 1 in which $3+n$ of said adjustable parameters are varied by said drive computer means, and said means is subjected to $n$ arbitrary restraints.

4. Apparatus for altering an original image of an object as said object appears when viewed from a first angle for the purpose of providing a resultant image simulating the appearance of the same object as said object appears when viewed from a different angle, comprising in combination, two anamorphosers and a variable effective focal length spherical lens all coaxially disposed along an optical axis, the powers and angular rotations of said anamorphosers and the power of said spherical lens constituting adjustable parameters, drive means for adjusting three of said adjustable parameters while simultaneously maintaining constant a pair of said adjustable parameters, and computer means responsive to input quantities commensurate with the difference between said first angle and said different angle for controlling said drive means, said drive means being so controlled by said computer means that each point of said resultant image is displaced with respect to the corresponding point of said original image by an amount proportional to the distance of said corresponding point from the horizon of said original image.

5. Apparatus for altering an original image of an object as said object appears when viewed from a first angle to provide a resultant image simulating the appearance of the same object viewed from a different angle, comprising in combination, first means for magnifying said original image uniformly, second means for effecting a first primitive transformation of the magnified image, third means for effecting a second primitive transformation of the image from said second means, and computer means responsive to input quantities which vary with the difference between said first angle and said different angle for controlling drive means to adjust said first, second and third means, said drive means being so controlled by said computer means that each point at said resultant image is displaced with respect to the corresponding point of said original image by an amount proportional to the distance of said corresponding point from the horizon of said original image.

6. Apparatus for altering an original image of an object as said object appears when viewed from a first angle to provide a resultant image simulating the appearance of the same object viewed from a different angle, comprising in combination, first means for effecting a first primitive transformation of said original image, second means for magnifying the transformed image, third means for effecting a second primitive transformation of said transformed and magnified image, and computer means responsive to input quantities which vary with the difference between said first angle and said different angle for controlling drive means to adjust said first, second and third means, said drive means being so controlled by said computer means that each point of said resultant image is displaced with respect to the corresponding point of said original image by an amount proportional to the distance of said corresponding point from the horizon of said original image.

7. Apparatus for altering an original image of an object as said object appears when viewed from a first angle to provide a resultant image simulating the appearance of the same object viewed from a different angle, comprising in combination first means for effecting a first primitive transformation of said original image, second means for effecting a second primitive transformation of said image, third means for magnifying said image, and computer means responsive to input quantities which vary with the difference between said first angle and said different angle for controlling drive means to adjust said first, second and third means, said drive means being so controlled by said computer means that each point of said resultant image is displaced with respect to the corresponding point of said original image by an amount proportional to the distance of said corresponding point from the horizon of said original image.

8. Apparatus for altering an original image of an object as said object appears when viewed from a first angle to provide a resultant image simulating the appearance of the same object viewed from a different angle, comprising in combination, a pair of anamorphosers and a variable effective focal length spherical lens coaxially disposed along an optical axis, each of said anamorphosers having a fixed anamorphic magnifying power, one of said anamorphosers being axially rotatable with respect to said object, and the other anamorphoser being axially rotatable with respect to said one anamorphoser, drive means for adjusting said spherical lens and the angular orientations of said anamorphosers, and computer means responsive to input quantities which vary with the difference between said first angle and said different angle, said drive means being so controlled by said computer means that each point of said resultant image is displaced with respect to the corresponding point of said original image by an amount proportional to the distance of said corresponding point from the horizon of said original image, the points of said resultant image on the same side of the horizon being displaced parallelly.

9. Apparatus for altering an original image of an object as said object appears when viewed from a first angle to provide a resultant image simulating the appearance of the same object viewed from a different angle, comprising in combination, a pair of anamorphosers and a variable effective focal length spherical lens coaxially disposed along an optical axis, the powers of said anamorphosers being variable, and the angular orientations of said anamorphosers being fixed against rotation about said axis with respect to said object, drive means for adjusting said spherical lens and the powers of said anamorphosers, and computer means responsive to input quantities which vary with the difference between said first angle and said different angle, said drive means being so controlled by said computer means that each point of said resultant image is displaced with respect to the corresponding point of said original image by an amount proportional to the distance of said corresponding point from the horizon of said original image, the points of said resultant image on the same side of the horizon being displaced parallelly.

10. Apparatus for altering an original image of an object as said object appears when viewed from a first angle to provide a resultant image simulating the appearance of the same object viewed from a different angle, comprising in combination, a pair of anamorphosers and a variable effective focal length spherical lens coaxially disposed along an optical axis, a first of said anamorphosers having variable power and being fixed against rotation about said axis with respect to said object, and a second of said anamorphosers having fixed power and being axially rotatable with respect to said first anamorphoser, drive means for adjusting said spherical lens and for adjusting the power of said first of said anamorphosers and the degree of rotation of said second of said anamorphosers, and computer means responsive to input quantities which vary with the difference between said first angle and said different angle, said drive means being so controlled by said computer means that each point of said resultant image is displaced with respect to the corresponding point of said original image by an amount proportional to the distance of said corresponding point from the horizon of said original image, the points of said resultant image on the same side of the horizon being displaced parallelly.

11. Apparatus for altering an original image of an object as said object appears when viewed from a first angle to provide a resultant image simulating the appearance of the same object viewed from a different angle, comprising in combination, a pair of anamorphosers and a variable effective focal length sphercial lens coaxially disposed along an optical axis, a first of said anamorphosers having fixed power and being rotatable axially with respect to said object, the second of said anamorphosers having variable power and being fixed against axial rotation with respect to said first anamorphoser, drive means for adjusting said spherical lens and for adjusting the degree of rotation of said first of said anamorphosers and the power of said second of said anamorphosers, and computer means responsive to input quantities which vary with the difference between said first angle and said different angle, said drive means being so controlled by said computer means that each point of said resultant image is displaced with respect to the corresponding point of said original image by an amount proportional to the distance of said corresponding point from the horizon of said original image, the points of said resultant image on the same side of the horizon being displaced parallelly.

12. Apparatus according to claim 1 in which said first primitive transformation means comprises scanning means for scanning said plane image to provide electrical potentials representative of said image, image forming means connected to receive said electrical potentials to provide a second image, and primitive transformation control means operable to control the relative operation of said scanning means and said image forming means to provide said second image as a primitively transformed replica of said plane image, said second primitive transformation means comprising apparatus similar to that of said first primitive transformation means for scanning said second image to provide a third image as a primitively transformed replica of said second image, and in which said uniform magnification means comprises means for varying the relative operation of one set of scanning and image forming means to provide a scale change of the image provided by said image forming means.

13. Apparatus for altering an original image of an object as said object appears when viewed from a first viewpoint represented by an altitude $h_1$ and a reference lateral position to provide a resultant image simulating the appearance of the same object viewed from a coplanar viewpoint represented by an altitude $h_2$ and a lateral position located at a distance $d$ from said reference lateral position wherein the dimensions $h_2$ and $d$ are measured in the plane of the original image, comprising in combination uniform magnification means acting upon said original image for providing a spherical magnification thereof having a power $P_0$, and means for providing a plurality of $n$ primitive transformations of said original image, said primitive transformations having powers designated by $m_1, m_2 \ldots m_{n-1}$, and $m_n$, respectively, and angular orientations with respect to the vertical dimension $h_1$ designated by the angles $\beta_1, \beta_2 \ldots \beta_{n-1}$, and $\beta_n$, respectively, drive means for adjusting a selected plurality of $P_0, m_1, m_2 \ldots m_{n-1}, m_n, \beta_1, \beta_2 \ldots \beta_{n-1}$, and $\beta_n$, and computer means providing signals to control said drive means in accordance with desired changes in viewpoint, said signals being determined by said computer means substantially in accordance with the following expressions:

$$b_0 h_1 = a_0 d - j_0 h_2$$
$$k_0 h_1 = a_0 h_2 + j_0 d$$
$$h_2/h_1 = (m_1 . m_2 \ldots m_{n-1} . m_n) P_0^2$$

wherein the determinant $$\begin{vmatrix} a_0 & b_0 \\ j_0 & k_0 \end{vmatrix}$$

is the product of the determinants of said $n$ individual transformation as follows:

$$\begin{vmatrix} a_0 & b_0 \\ j_0 & k_0 \end{vmatrix} = \begin{vmatrix} a_n & b_n \\ j_n & k_n \end{vmatrix} \cdot \begin{vmatrix} a_{n-1} & b_{n-1} \\ j_{n-1} & k_{n-1} \end{vmatrix} \cdot \ldots \cdot \begin{vmatrix} a_2 & b_2 \\ j_2 & k_2 \end{vmatrix} \cdot \begin{vmatrix} a_1 & b_1 \\ j_1 & k_1 \end{vmatrix}$$

wherein the individual determinants are related as follows:

$$\begin{vmatrix} a_1 & b_1 \\ j_1 & k_1 \end{vmatrix}$$

wherein $$a_1 = m_1 \sin^2 \beta_1 + \cos^2 \beta_1$$
$$b_1 = j_1 = (m_1 - 1) \sin \beta_1 \cos \beta_1$$
$$k_1 = \sin^2 \beta_1 + m_1 \cos^2 \beta_1$$

$$\begin{vmatrix} a_2 & b_2 \\ j_2 & k_2 \end{vmatrix}$$

wherein $$a_2 = m_2 \sin^2 \beta_2 + \cos^2 \beta_2$$
$$b_2 = j_2 = (m_2 - 1) \sin \beta_2 \cos \beta_2$$
$$k_2 = \sin^2 \beta_2 + m_2 \cos^2 \beta_2$$

etcetera to $$\begin{vmatrix} a_{n-1} & b_{n-1} \\ j_{n-1} & k_{n-1} \end{vmatrix}$$

wherein $$a_{n-1} = m_{n-1} \sin^2 \beta_{n-1} + \cos^2 \beta_{n-1}$$
$$b_{n-1} = j_{n-1} (m_{n-1} - 1) (\sin \beta_{n-1} \cos \beta_{n-1})$$
$$k_{n-1} = \sin^2 \beta_{n-1} + m_{n-1} \cos^2 \beta_{n-1}$$

and $$\begin{vmatrix} a_n & b_n \\ j_n & k_n \end{vmatrix}.$$

wherein $$a_n = m_n \sin^2 \beta_n + \cos^2 \beta_n$$
$$b_n = j_n = (m_n - 1) \sin \beta_n \cos \beta_n$$
$$k_n = \sin^2 \beta_n + m_n \cos^2 \beta_n$$

References Cited in the file of this patent

UNITED STATES PATENTS

| | | |
|---|---|---|
| 751,347 | Scheimpflug | Feb. 2, 1904 |
| 886,770 | De Zeng | May 5, 1908 |
| 1,283,676 | Comstock et al. | Nov. 5, 1918 |
| 1,292,901 | Smith | Jan. 28, 1919 |
| 1,321,906 | Gehrmann | Nov. 18, 1919 |
| 1,528,021 | Janzer | Mar. 3, 1925 |
| 1,647,631 | Ives | Nov. 1, 1927 |
| 1,654,070 | Corlett et al. | Dec. 27, 1927 |
| 1,781,501 | Ford | Nov. 11, 1930 |
| 1,829,634 | Chretien | Oct. 27, 1931 |
| 1,898,787 | Newcomer | Feb. 21, 1933 |
| 2,098,390 | Iams | Nov. 9, 1937 |
| 2,234,806 | Ploke | Mar. 11, 1941 |
| 2,337,363 | Ames | Dec. 21, 1943 |
| 2,391,430 | Macek | Dec. 25, 1945 |
| 2,404,030 | Browne | July 16, 1946 |
| 2,419,939 | Ames | May 6, 1947 |
| 2,428,399 | Timoney | Oct. 7, 1947 |
| 2,595,691 | Morton | May 6, 1952 |
| 2,619,870 | Torricelli | Dec. 2, 1952 |
| 2,720,813 | Cox | Oct. 18, 1955 |
| 2,720,815 | Mellburg | Oct. 18, 1955 |
| 2,752,821 | Cook | July 3, 1956 |
| 2,798,411 | Coleman | July 9, 1957 |